United States Patent
Katis et al.

(10) Patent No.: US 8,233,598 B2
(45) Date of Patent: *Jul. 31, 2012

(54) TELECOMMUNICATION AND MULTIMEDIA MANAGEMENT METHOD AND APPARATUS

(75) Inventors: Thomas E. Katis, Jackson, WY (US); James T. Panttaja, Healdsburg, CA (US); Mary G. Panttaja, Healdsburg, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 845 days.

This patent is subject to a terminal disclaimer.

(21) Appl. No.: 12/206,548

(22) Filed: Sep. 8, 2008

(65) Prior Publication Data

US 2009/0103695 A1 Apr. 23, 2009

Related U.S. Application Data

(60) Provisional application No. 60/999,619, filed on Oct. 19, 2007, provisional application No. 61/085,199, filed on Jul. 31, 2008.

(51) Int. Cl.
*H04M 1/64* (2006.01)
(52) U.S. Cl. ............... 379/88.23; 379/88.14; 379/93.15; 370/401; 370/432
(58) Field of Classification Search .... 379/88.22–88.26, 379/93.12, 265.09, 106.09, 88.13, 88.14, 379/93.15, 100.13, 142.14; 709/206, 219, 709/217; 370/352, 401, 432
See application file for complete search history.

(56) References Cited

U.S. PATENT DOCUMENTS

| | | | |
|---|---|---|---|
| 4,807,224 | A | 2/1989 | Naron et al. |
| 5,117,422 | A | 5/1992 | Hauptschein et al. |
| 5,283,818 | A | 2/1994 | Klausner et al. |
| 5,375,018 | A | 12/1994 | Klausner et al. |

(Continued)

FOREIGN PATENT DOCUMENTS

WO    WO 03/073642    9/2003

(Continued)

OTHER PUBLICATIONS

"dircproxy," http://home.pcisys.net/~tbc/hacks/dircproxy.htm, Downloaded on Sep. 26, 2008, 1 page.

(Continued)

*Primary Examiner* — MD S Elahee
(74) *Attorney, Agent, or Firm* — Beyer Law Group LLP

(57) ABSTRACT

A remote conversation management device to manage conversations on a first communication device. The method includes maintaining a gateway node having a first interface to enable the gateway node to receive conversation control information from the remote conversation management device and a second interface to couple the gateway node to a communication network, where the communication network is configured to support a conversation between a first communication device and one or more other communication devices over the communication network. The method further includes storing in a message buffer the media of the conversation as the media is received through the second interface from the communication network and receiving conversation control information from the remote conversation management device through the first interface. The method further includes managing the rendering of the media of the conversation for the first communication device in response to the received control information from the remote conversation management device by controlling the timing of when the media of the conversation is (i) retrieved from the message buffer and (ii) transmitted over the communication network to the first communication device.

29 Claims, 22 Drawing Sheets

U.S. PATENT DOCUMENTS

| | | | |
|---|---|---|---|
| 5,390,236 | A | 2/1995 | Klausner et al. |
| 5,402,474 | A * | 3/1995 | Miller et al. ............... 379/93.12 |
| 5,487,167 | A | 1/1996 | Dinallo et al. |
| 5,524,140 | A | 6/1996 | Klausner et al. |
| 5,572,576 | A | 11/1996 | Klausner et al. |
| 5,692,213 | A | 11/1997 | Goldberg et al. |
| 5,734,963 | A | 3/1998 | Fitzgerald et al. |
| 5,737,011 | A | 4/1998 | Lukacs |
| 5,918,158 | A | 6/1999 | LaPorta et al. |
| 5,963,551 | A | 10/1999 | Minko |
| 5,970,122 | A | 10/1999 | LaPorta et al. |
| 6,037,932 | A | 3/2000 | Feinleib |
| 6,092,120 | A | 7/2000 | Swaminathan et al. |
| 6,104,757 | A | 8/2000 | Rhee |
| 6,175,619 | B1 | 1/2001 | DeSimone |
| 6,233,389 | B1 | 5/2001 | Barton et al. |
| 6,262,994 | B1 | 7/2001 | Dirschedl et al. |
| 6,378,035 | B1 | 4/2002 | Parry et al. |
| 6,430,607 | B1 * | 8/2002 | Kavner ........................ 709/217 |
| 6,480,783 | B1 | 11/2002 | Myr |
| 6,507,586 | B1 | 1/2003 | Satran et al. |
| 6,564,261 | B1 | 5/2003 | Gudjonsson et al. |
| 6,577,599 | B1 | 6/2003 | Gupta et al. |
| 6,580,694 | B1 | 6/2003 | Baker |
| 6,594,693 | B1 * | 7/2003 | Borwankar ................... 709/219 |
| 6,671,732 | B1 | 12/2003 | Weiner |
| 6,717,925 | B1 | 4/2004 | Leppisaari et al. |
| 6,721,703 | B2 | 4/2004 | Jackson et al. |
| 6,791,949 | B1 | 9/2004 | Ryu et al. |
| 6,807,565 | B1 | 10/2004 | Dodrill et al. |
| 6,807,578 | B2 | 10/2004 | Satran et al. |
| 6,829,473 | B2 | 12/2004 | Raman et al. |
| 6,834,039 | B1 | 12/2004 | Kelly et al. |
| 6,850,965 | B2 | 2/2005 | Allen |
| 6,882,725 | B2 * | 4/2005 | Ko ........................... 379/265.09 |
| 6,912,544 | B1 | 6/2005 | Weiner |
| 6,931,114 | B1 | 8/2005 | Martin |
| 6,970,926 | B1 | 11/2005 | Needham et al. |
| 6,973,309 | B1 | 12/2005 | Rygula et al. |
| 6,993,009 | B2 | 1/2006 | Kelly et al. |
| 6,996,624 | B1 | 2/2006 | LeCroy et al. |
| 7,002,913 | B2 | 2/2006 | Huang et al. |
| 7,039,040 | B1 | 5/2006 | Burg |
| 7,039,675 | B1 | 5/2006 | Kato |
| 7,047,030 | B2 | 5/2006 | Forsyth |
| 7,111,044 | B2 | 9/2006 | Lee |
| 7,117,521 | B2 | 10/2006 | Puthiyedath |
| 7,139,371 | B2 | 11/2006 | McElvaney |
| 7,171,491 | B1 | 1/2007 | O'Toole et al. |
| 7,187,941 | B2 | 3/2007 | Siegel |
| 7,218,709 | B2 | 5/2007 | Garg et al. |
| 7,233,589 | B2 | 6/2007 | Tanigawa et al. |
| 7,236,738 | B2 | 6/2007 | Settle |
| 7,240,105 | B2 | 7/2007 | Satran et al. |
| 7,304,951 | B2 | 12/2007 | Rhee |
| 7,305,438 | B2 | 12/2007 | Christensen et al. |
| 7,313,593 | B1 | 12/2007 | Pulito et al. |
| 7,349,871 | B2 | 3/2008 | Labrou et al. |
| 7,382,881 | B2 | 6/2008 | Uusitalo et al. |
| 7,403,775 | B2 | 7/2008 | Patel et al. |
| 7,460,546 | B2 * | 12/2008 | Anderson, IV ............... 370/401 |
| 7,626,951 | B2 | 12/2009 | Croy et al. |
| 2001/0025377 | A1 | 9/2001 | Hinderks |
| 2002/0128029 | A1 | 9/2002 | Nishikawa et al. |
| 2002/0150094 | A1 | 10/2002 | Cheng et al. |
| 2002/0154745 | A1 | 10/2002 | Shtivelman |
| 2002/0159600 | A1 | 10/2002 | Weiner |
| 2002/0184368 | A1 | 12/2002 | Wang |
| 2003/0027566 | A1 | 2/2003 | Weiner |
| 2003/0028632 | A1 | 2/2003 | Davis |
| 2003/0099198 | A1 | 5/2003 | Kiremidjian et al. |
| 2003/0126162 | A1 | 7/2003 | Yohe et al. |
| 2003/0186722 | A1 | 10/2003 | Weiner |
| 2004/0017905 | A1 | 1/2004 | Warrier et al. |
| 2004/0019539 | A1 | 1/2004 | Raman et al. |
| 2004/0074448 | A1 | 4/2004 | Bunt |
| 2004/0090959 | A1 | 5/2004 | Cinghita et al. |
| 2004/0095900 | A1 | 5/2004 | Siegel |
| 2004/0117722 | A1 | 6/2004 | Harada |
| 2004/0192353 | A1 | 9/2004 | Mason et al. |
| 2004/0192378 | A1 | 9/2004 | Wulkan |
| 2004/0252679 | A1 | 12/2004 | Williams et al. |
| 2004/0255148 | A1 | 12/2004 | Monteiro et al. |
| 2004/0258220 | A1 | 12/2004 | Levine et al. |
| 2005/0021819 | A1 | 1/2005 | Kilkki |
| 2005/0025308 | A1 | 2/2005 | Tischer et al. |
| 2005/0030932 | A1 | 2/2005 | Kelly et al. |
| 2005/0037706 | A1 | 2/2005 | Settle |
| 2005/0053033 | A1 | 3/2005 | Kelly et al. |
| 2005/0102358 | A1 | 5/2005 | Gold et al. |
| 2005/0135333 | A1 | 6/2005 | Rojas |
| 2005/0144247 | A1 | 6/2005 | Christensen et al. |
| 2005/0160345 | A1 | 7/2005 | Walsh et al. |
| 2005/0202807 | A1 | 9/2005 | Ayyasamy |
| 2005/0207487 | A1 | 9/2005 | Monroe |
| 2005/0215228 | A1 | 9/2005 | Fostick et al. |
| 2005/0220137 | A1 | 10/2005 | Prigent et al. |
| 2005/0259682 | A1 | 11/2005 | Yosef et al. |
| 2005/0288101 | A1 | 12/2005 | Lockton et al. |
| 2006/0007943 | A1 | 1/2006 | Fellman |
| 2006/0045038 | A1 | 3/2006 | Kay et al. |
| 2006/0059267 | A1 | 3/2006 | Cugi et al. |
| 2006/0059342 | A1 | 3/2006 | Medvinsky et al. |
| 2006/0093304 | A1 | 5/2006 | Battey et al. |
| 2006/0107285 | A1 | 5/2006 | Medvinsky |
| 2006/0146822 | A1 | 7/2006 | Kolakowski et al. |
| 2006/0187897 | A1 | 8/2006 | Dabbs et al. |
| 2006/0189305 | A1 | 8/2006 | Ando et al. |
| 2006/0212582 | A1 | 9/2006 | Gupta et al. |
| 2006/0212592 | A1 | 9/2006 | Gupta et al. |
| 2006/0224748 | A1 | 10/2006 | Gupta et al. |
| 2006/0244588 | A1 | 11/2006 | Hannah et al. |
| 2006/0245367 | A1 | 11/2006 | Jeffery et al. |
| 2006/0248149 | A1 * | 11/2006 | Kraft et al. .................... 709/206 |
| 2006/0253599 | A1 | 11/2006 | Monteiro et al. |
| 2006/0268750 | A1 | 11/2006 | Weiner |
| 2006/0274698 | A1 | 12/2006 | Twitchell |
| 2006/0276714 | A1 | 12/2006 | Holt et al. |
| 2006/0282544 | A1 | 12/2006 | Monteiro et al. |
| 2006/0288391 | A1 | 12/2006 | Puthiyedath |
| 2006/0294259 | A1 | 12/2006 | Matefi et al. |
| 2007/0001869 | A1 | 1/2007 | Hunzinger |
| 2007/0180032 | A1 | 8/2007 | Pearson |
| 2007/0182819 | A1 | 8/2007 | Monroe |
| 2007/0207785 | A1 | 9/2007 | Chatterjee et al. |
| 2008/0000979 | A1 | 1/2008 | Poisner |
| 2008/0002621 | A1 | 1/2008 | Ginzburg et al. |
| 2008/0002691 | A1 | 1/2008 | Qi et al. |
| 2008/0086700 | A1 | 4/2008 | Rodriguez et al. |
| 2008/0095338 | A1 * | 4/2008 | Cosky ........................ 379/88.22 |
| 2008/0123623 | A2 * | 5/2008 | Kurganov .................... 370/352 |
| 2008/0134054 | A1 | 6/2008 | Clark et al. |
| 2008/0187116 | A1 * | 8/2008 | Reeves et al. ............ 379/106.09 |
| 2009/0063698 | A1 | 3/2009 | Xu et al. |
| 2009/0103693 | A1 | 4/2009 | Katis et al. |
| 2009/0175425 | A1 | 7/2009 | Lee |

FOREIGN PATENT DOCUMENTS

| | | |
|---|---|---|
| WO | WO 2006/114673 | 11/2006 |
| WO | WO 2007/026320 | 3/2007 |

OTHER PUBLICATIONS

Apple Inc., "*iPhone User's Guide*," http://manuals.info.apple.com/en_US/iPhone_User_Guide.pdf, Downloaded on Oct. 3, 2008, 154 pages.

Brandx.net, "*Using Talk*," http://www.brandx.net/support/usingtelnet/talk.shtml, Downloaded on Sep. 19, 2008, 2 pages.

Businesswire.com "*LignUp 4.0 Delivers Industry's Most Comprehensive Suite of Communications Web Services*," http://www.businesswire.com/portal/site/google/index.jsp?ndmViewId=news_view&newsId=20070430005498&newsLang=en, Downloaded on Nov. 21, 2008, 10 pages.

Calore, Michael, "*SpinVox Moves Into VoIP, Brings Voice-to-Text to Skype Users*," Monkey_Bites, http://blog.wired.com/monkeybites/2007/08/spinvox-moves-i.html, Downloaded on Oct. 3, 2008, 4 pages.

Cardci et al., "*MAC Layer QoS Support for Wireless Networks of Unmanned Air Vehicles*," Proceedings of the 37th Hawaii International Conference on System Sciences—2004, Jan. 5-8, 2004, pp. 9 pp.

Charny, Ben, "*Nextel pushes new 'push to talk' features*," URL: http://news.zdnet.com/2100-9584_22-134945.html, Mar. 18, 2004, 3 pages.

Chen et al., "*An Adaptive Multimedia Transmission Protocol for Distributed Multimedia Applications*," Proceedings of the 5th International Workshop on Multimedia Network Systems and Applications (MNSA'2003), in conjunction with The 23rd International Conference on Distributed Computing Systems (ICDCS-2003), 6 pages.

Dannen, Chris, "*Technology: The Skype Mobile Phone Will Blow Your Mind*," Dec. 18, 2007, URL: http://www.fastcompany.com/blog/chris-dannen/lab/technology-skype-mobile-phone-will-blow-your-mind, 2 pages.

Erwu et al., "*Packet-late indication based (PLIB): adaptive jitter buffer*," ACM International Conference Proceeding Series; vol. 58, Proceedings of the winter international symposium on Information and communication technologies, Cancun, Mexico, Session: Performance, reliability, and quality of service, pp. 1-5 Year of Publication: 2004.

FAQS.org, "*RFC1644—T/TCP—TCP Extensions for Transactions Functional S*," http://www.faqs.org/rfcs/rfc1644.html, Downloaded on Sep. 19, 2008, 26 pages.

FluidVoice "Overview of FluidVoice," http://viral.media.mit.edu/wiki/tiki-index.php?page=FluidVoice, Downloaded on Sep. 16, 2008, 2 pages.

GrandCentral.com, "*Call Record*," http://www.grandcentral.com/howitworks/call_record, Downloaded on Sep. 26, 2008, 1 page.

GrandCentral.com, "*One Voicemail Box*," http://www.grandcentral.com/home/one_voicemail, Downloaded on Sep. 26, 2008, 1 page.

GrandCentral.com, "*So Many Features, You Won't Believe it*," http://www.grandcentral.com/support/howitworks/, Downloaded on Sep. 26, 2008, 1 page.

GrandCentral.com, "Voicemail forwarding," http://www.grandcentral.com/howitworks/voicemail_forwarding, Downloaded on Sep. 26, 2008, 1 page.

Henshall, Stuart, "*HotRecorder—Record Skype Calls*," Skype Journal, URL: http://skypejournal.com/blog/archives/2005/03/hotrecorder_rec.php, Mar. 25, 2005, 11 pages.

IRCHelp.org, "*An IRC Tutorial*," http://www.irchelp.org/irchelp/irctutorial.html, Downloaded on Sep. 26, 2008, 14 pages.

Kadoink.com, "*Get a Widget*," http://www.kadoink.com/index.cfm?action=getWidgets, Downloaded on Sep. 19, 2008, 3 pages.

Krishnan et al., "*EVRC-Wideband: The New 3GPP2 Wideband VOCODER Standard*," IEEE International Conference on Acoustics, Speech and Signal Processing, 2007. ICASSP 2007, Publication Date: Apr. 15-20, 2007, vol. 2, on pp. II-333-II-336, Honolulu, HI.

Layton, Julia, "*How Slingbox Works*," Jan. 4, 2006, HowStuffWorks.com, http://electronics.howstuffworks.com/slingbox.htm, 9 pages.

LignUp.com, "*LignUp Communications Applications Server*," http://www.lignup.com/platform/index.html, Downloaded on Sep. 19, 2008, 1 page.

Network Dictionary, "*Instant Message (IM) Technology Overview*," http://www.networkdictionary.com/networking/im.php, Downloaded on Sep. 16, 2008, 2 pages.

Nikotalkie.com, "*Nikotalkie—Home*," http://www.nikotalkie.com/, Downloaded on Sep. 19, 2008, 2 pages.

Nikotel.com, "*Click-Pop-Talk WebStart Phone*," http://www.nikotel.com/nikotel-click-pop-talk-java-phone.html, Downloaded on Sep. 19, 2008, 1 page.

Notaras, George, "*dircproxy IRC Proxy*," http://www.g-loaded.eu/2007/02/01/dircproxy-irc-proxy/, Downloaded on Sep. 26, 2008 4 pages.

Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.

Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.

Piecuch et al., "*A Selective Retransmission Protocol for Multimedia on the Internet*," In Proceedings of SPIE Multimedia Systems and Applications, Nov. 2000, Boston MA, USA, 12 pages.

Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.

Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, on pp. 603-606.

Rey et al., "*I-D Action:draft-ietf-avt-rtp-retransmission-09.txt*," Aug. 5, 2003, http://osdir.com/ml/ietf.avt/2003-08/msg00003.html, Downloaded on Sep. 19, 2008, 2 pages.

Ribbit.com, "*Amphibian*," http://www.ribbit.com/everyday/, Downloaded on Sep. 26, 2008, 1 page.

Ribbit.com, "*Enhanced Visual Voicemail*," http://www.ribbit.com/everyday/tour/enhanced_visual_voicemail.php, Downloaded on Sep. 26, 2008, 2 pages.

Ribbit.com, "*What is Ribbit? Features*," http://www.ribbit.com/platform/features.php, Downloaded on Sep. 26, 2008, 1 page.

Ribbit.com, "*What is Ribbit? Overview*," http://www.ribbit.com/platform/index.php, Downloaded on Sep. 26, 2008, 1 page.

Ribbit.com, "*What is Ribbit? Voice Architecture*," http://www.ribbit.com/platform/architecture.php, Downloaded on Sep. 26, 2008, 2 pages.

Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.

Skype.com, "*Making calls is just the start*," URL: http://www.skype.com/features/, Downloaded on Sep. 16, 2008, 2 pages.

Spinvox.com, "*Home Page*," http://www.spinvox.com/, Downloaded on Sep. 26, 2008, 3 pages.

Spinvox.com, "*How Does it Work?*," http://www.spinvox.com/how_it_works.html, Downloaded on Sep. 19, 2008, 2 pages.

Swissvoice.net, "*PSTN*," http://www.swissvoice.net/ww/htm_ww/08_technology/content_pstn.html, Downloaded on Sep. 19, 2008, 3 pages.

Tektronix, "*VOIP Technology Overview; Protocols, Convergence, Testing*," http://www.tektronics.com/voip, May 12, 2006.

The Jabber Extensible Communications Platform™, "*Products // Jabber XCP*," URL: http://www.jahher.com/CE/JahherXCP, Downloaded on Sep. 16, 2008, 2 pages.

ThunkDifferent.com, "*YouMail vs. Google Grandcentral Voice Mail Service*," http://thunkdifferent.com/2007/10/11/youmail-vs-google-grandcentral-voice-mail-service/ , Downloaded on Oct. 3, 2008, 6 pages.

VOIP-News.com, "*Company Profile, LignUp*," http://www.voip-news.com/vendors/lignup/, Downloaded on Dec. 5, 2008, 6 pages.

WikiBooks, "*Internet Technologies/IRC,*" http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*", http://en.wikipedia.org/wiki/TiVo, Downloaded on Sep. 16, 2008, 6 pages.

Yavuz et al., "*VoIP over cdma2000 1xEV-DO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

HotRecorder.com, "FAQs," http://www.hotrecorder.com/music_support.asp, downloaded on Sep. 26, 2008, 1 page.
WikiPedia—The Free Encyclopedia, "*Skype*," http://en.wikipedia.org/wiki/Skype, Downloaded on Sep. 26, 2008, 7 pages.
WikiPedia—The Free Encyclopedia, "*Skype Protocol*," http://en.wikipedia.org/wiki/Skype, Downloaded on Sep. 26, 2008, 4 pages.
Jabber.org, "*Main page*," http://www.jabber.org/web/main_page, Sep. 2, 2008, downloaded on Sep. 26, 2008, 1 page.
Jabber.org, "*FAQ*," http://www.jabber.org/web/faq, Sep. 4, 2008, downloaded on Sep. 26, 2008, 2 pages.
Apple Inc., "*iPhone: About Visual Voicemail*," http://www.support.apple.com/kb/HT1486, Downloaded on Sep. 26, 2008, 3 pages.
Jabber.org, "*Products // Jabber XCP // Benefits*," http://www.jabber.com/CE/JabberXCPBenefits, downloaded on Sep. 26, 2008, 1 page.
Jabber.org, "*Products // Jabber Clients*," http://www.jabber.com/CE/JabberClients, downloaded on Sep. 26, 2008, 1 page.
Jabber.org, "*Products // JabberNow*" http://www.jabber.com/CE/JabberNow, downloaded on Sep. 26, 2008, 1 page.
KillerStartups.com, "*Kadoink.com—Mobilizing your Socializing*," http://www.killerstartups.com/Web20/kadoink-com-moblizing-your-socializing, Downloaded on Sep. 26, 2008, 3 pages.
CNETNews.com, "*Kadoink's phonecast lines officially open for texting*," http://news.cnet.com/8301-17939_109-9829877-2.html, downloaded on Sep. 26, 2008, 1 page.
BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.
VOIP-News.com, "*Company Profile—LignUp*," http://www.voip-news.com/vendors/lignup/, Downloaded on Oct. 3, 2008, 6 pages.
JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.
WikiPedia—The Free Encyclopedia, "*Push to Talk*" http://en.wikipedia.org/wiki/Push_to_talk, Downloaded on Sep. 26, 2008, 3 pages.
WikiPedia—The Free Encyclopedia, "*Slingbox*" http://en.wikipedia.org/wiki/Slingbox, Downloaded on Sep. 26, 2008, 4 pages.
About.com, "*Linux / Unix Command: talk*,"http://linux.about.com/od/commands/l/blcmdl1_talk.htm, Downloaded on Sep. 26, 2008, 2 pages.
Fall, Kevin, "*A Delay-Tolerant Network Architecture for Challenged Internets*," Feb. 2003, http://www.dtnrg.org/docs/papers/IRB-TR-03-003.pdf, 15 pages.
Chuah et al., "*Store-and-Forward Performance in a DTN*," Vehicular Technology Conference, 2006. VTC 2006-Spring. IEEE 63$^{rd}$, Publication Date: May 7-10, 2006, vol. 1, on pp. 187-191.
Krishnan, et al., "The Spindle Disruption-Tolerant Networking System," Military Communications Conference, 2007. MILCOM 2007. IEEE vol. Issue , Oct. 29-31, 2007 pp. 1-7.
WikiPedia—The Free Encyclopedia, "*Visual Voicemail*" http://en.wikipedia.org/wiki/Visual_voicemail, downloaded on Sep. 26, 2008, 1 page.
Amir et al., "*An Overlay Architecture for High Quality VoIP Streams*,", IEEE Transactions on Multimedia, Publication Date: Dec. 2006, vol. 8, Issue:6, on pp. 1250-1262.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.
Baset et al., "*An Analysis of the Skype Peer-to-Peer Internet Telephony Protocol*," INFOCOM 2006. 25th IEEE International Conference on Computer Communications. Proceedings (2006), pp. 1-11.
Cerf et al., "*A Protocol for Packet Network Intercommunication*," Communications, IEEE Transactions on, vol. 22, Issue 5, May 1974 pp. 637-648.
International Search Report from corresponding PCT Application No. PCT/US2008/079230, mailed May 19, 2009.
Written Opinion from corresponding PCT Application No. PCT/US2008/079230, mailed May 19, 2009.
WikiPedia—The Free Encyclopedia, "*Eudora (email client)*," http://en.wikipedia.org/wiki/Eudora_(e-mail_client), Downloaded on Aug. 20, 2009, 3 pages.
"*Eudora*," Answers.com, http://www.answers.com/topic/eudora-e-mail-client, Downloaded on Aug. 20, 2009, 4 pages.
"The Eudora Open Messaging Advantage," Qualcomm, 1997, Part No. 100-50030-1, 23 pages.
"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.
"*Aspera—Next Generation File Transport—fasp™ transfer times*," Asperasoft.com, http://www.asperasoft.com/en/technology/fasp_transfer_times_14/fasp_transfer_times_14, Downloaded on Sep. 22, 2009, 1 page.
"*Aspera—Next Generation File Transport—the fasp solution,*" Asperasoft.com, http://www.asperasoft.com/en/technology/fasp_solution_3/the_fasp_solution_3, Downloaded on Sep. 22, 2009, 3 pages.
"*Aspera—Next Generation File Transport—the shortcomings of TCP file transfer*," Asperasoft.com, http://www.asperasoft.com/en/technology/shortcomings_of_TCP_2/the_shortcomings_of_TCP_file_transfer_2, Downloaded on Sep. 22, 2009, 2 pages.
"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.
"*Aspera fasp™High Speed Transport—A Critical Technology Comparison,*" White Paper, Asperasoft.com, http://www.asperasoft.com/en/technology/white_papers_13/aspera_fasp_high_speed_transport_13, Downloaded on Sep. 22, 2009, 11 pages.
"*Palringo Brings First Push-to-Talk Application to the iPhone,*" RedOrbit.com, http://www.redorbit.com/news/technology/1525545/palringo_brings_first_pushtotalk_application_to_the_iphone/index.html, Downloaded on Aug. 13, 2009, 2 pages.
*Palringo—Features*, Palringo.com, http://www.palringo.com/en/gb/features/, Downloaded on Aug. 13, 2009, 1 page.
Moren, Dan, "*Palringo Brings Picture Messaging to Iphone*," http://www.pcworld.com/article/149108/palringo_brings_picture_messaging_to_iphone.html, Downloaded on Aug. 13, 2009, 3 pages.
Paul, Ryan, "*Gmail gets Google Talk integration*,"Arstechnica.com, http://arstechnica.com/old/content/2006/02/6128.ars , Downloaded on Aug. 20, 2009, 1 page.
Sherman, Chris, "*Google Integrates Chat with Gmail*,"Search Engine Watch, http://searchenginewatch.com/3583121, Feb. 7, 2006, Downloaded on Aug. 20, 2009, 2 pages.
"*About Gmail*," http://mail.google.com/mail/help/chat.html, Downloaded on Aug. 20, 2009, 3 pages.
WikiPedia—The Free Encyclopedia, "*Google Talk*," http://en.wikipedia.org/wiki/Google_Talk, Downloaded on Aug. 20, 2009, 8 pages.
Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.
Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.
WikiPedia—The Free Encyclopedia, "*Palringo*" http://en.wikipedia.org/wiki/Palringo, Downloaded on Aug. 13, 2009, 1 page.
Final Office Action in U.S. Appl. No. 12/206,537, dated Jan. 26, 2012.
Office Action in U.S. Appl. No. 12/206,537, dated Aug. 5, 2011.

\* cited by examiner

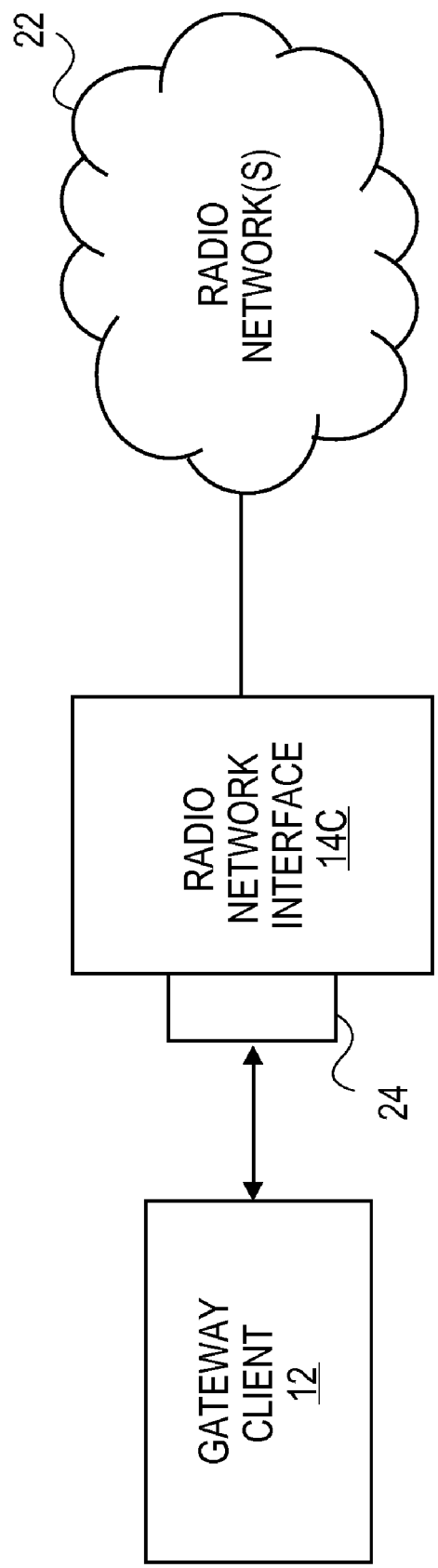

MCMS-S
Conversations
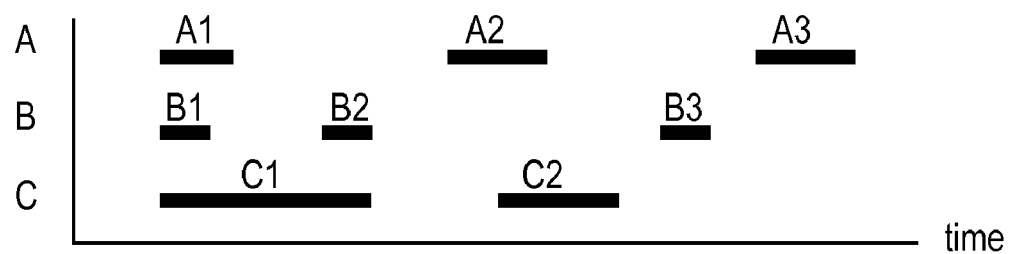
Rendering
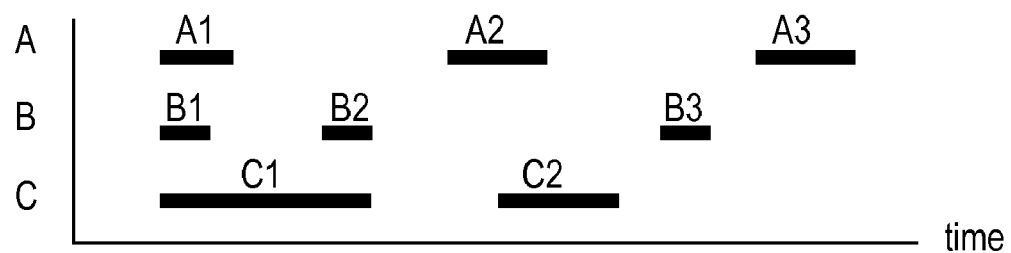
FIG. 10

TELECOMMUNICATION AND MULTIMEDIA MANAGEMENT METHOD AND APPARATUS

CROSS-REFERENCE TO RELATED APPLICATIONS

This application claims the benefit of priority to U.S. Provisional Patent Application No. 60/999,619 filed on Oct. 19, 2007, entitled "Telecommunication and Multimedia Management System and Method," and U.S. Provisional Patent Application No. 61/085,199 filed Jul. 31, 2008, and entitled "Telecommunication and Multimedia Management System and Method.".

BACKGROUND

1. Field of the Invention

This invention pertains to telecommunications, and more particularly, to a telecommunication and multimedia management system and method that enables users of legacy communication devices to participate in conversations in either a near real-time mode or a time-shifted mode, to transition the conversation back and forth between the two modes, to participate in multiple conversations, and to archive the messages of conversations for later review or processing.

2. Description of Related Art

The current state of voice communications suffers from inertia. In spite of automated switching, high bandwidth networks and technologies such as satellites, fiber optics, Voice over IP (VoIP), wireless and cellular networks, there has been little change in how people use telephones. One is still required to pick up the phone, dial another party, wait for a connection to be made, and then engage in a full-duplex, synchronous conversation with the dialed party. If the recipient does not answer, no connection is made, and the conversation does not take place.

At best, a one-way voice message may be left if the recipient has voice mail. The process of delivering the voice mail, however, is burdensome and time consuming. The caller is required to wait for the phone on the other end to stop ringing, transition into the voice mail system, listen to a voice message greeting, and then leave the message. Current voice mail systems are also inconvenient for the recipient. The recipient has to dial a code to access their voice mail, navigate through a series of prompts, listen to any earlier received voice messages in the queue, and then finally listen to the message of the sender.

Another drawback with typical voice mail systems is the inability to organize or permanently archive voice messages. With some voice mail systems, a user may save a message, but it is automatically deleted after a predetermined period of time and lost forever.

Yet another problem with current voice mail systems is that a connection must be made between the caller and the voice mail system before a message can be left. If no connection is made, there is no way for the caller to leave a message.

Current telephone systems are based on relatively simplistic usage patterns: real-time live calls or disjointed voice mail messages, which are typically deleted as they are heard. These forms of voice communications do not capture the real power that can be achieved with voice communication or take advantage of the advances of network speed and bandwidth that is now available. Also, if the phone network is down, or is inaccessible, (e.g., a cell phone user is in an area of no coverage or the phone system has temporarily run out of resources), no communication can take place.

In general, telephone based communications have not kept pace with the advances in text-based communications. Instant messaging, emailing, faxing, chat groups, and the ability to archive text messages, are all commonplace with text based communications. Compared to text communication systems there are few existing tools available to manage and/or archive voice communications. Voice mail is the notable exception, but it suffers from the limitations as outlined above.

The corporate environment provides just one example of the weakness in current voice communication tools. There is currently no integrated way to manage voice communications as a corporate asset across an organization. Employees generally do not record or persistently store their phone conversations. Most business related voice communication assets are gone as quickly as the words are spoken, with no way to manage or store the content of those conversations in any manageable form.

As an illustrative example, consider a sales executive at a company. During the course of a busy day, the executive may make a number of calls, closing several sales with customers over the phone. Without the ability to organize, store, and later retrieve these conversations, there is no way for the executive to resolve potential issues that may arise, such as recalling the terms of one deal versus another, or challenging a customer who disputes the terms of a previously agreed upon sale. If this executive had the ability to easily retrieve and review conversations, these types of issues could be easily and favorably resolved.

Current tactical radio systems, such as those used by the military, fire, police, paramedics, rescue teams, and first responders, also suffer from a number of deficiencies. Most tactical radio communication must occur through a "live" radio connection between the sender of a message and a recipient. If there is no radio connection between the two parties, there can be no communication. Urgent messages cannot be sent if either the sender or the receiver does not have access to their radio or a radio circuit connection is not established. Tactical communications are therefore plagued with several basic problems. There is no way: (i) to guarantee the delivery of messages: (ii) for a recipient to go back and listen to a message that was not heard in real time; (iii) to control the granularity of the participants in a conversation; and (iv) for the system to cope with the lack of adequate signal for a live conversation. If a message is not heard live, it is missed. There are no tools for either the sender or a recipient to manage, prioritize, archive, and later retrieve (i.e. time-shift) the messages of a conversation that were previously sent.

Yet another drawback with tactical radio communication systems is that only one radio may transmit at a time per channel. Consider an example of a large building fire, where multiple teams of fire fighters, police, and paramedics are simultaneously rescuing victims trapped in the building, fighting the fire, providing medical aid to victims, and controlling bystanders. If each of the teams is using the same channel, communications may become crowded and chaotic. Transmissions get "stepped on" when more than one person is transmitting at the same time. Also there is no way to differentiate between high and low priority messages. A team inside the burning building fighting the fire or rescuing trapped victims should have a higher priority over other teams, such as those controlling bystanders. If high priority messages are stepped on by lower priority messages, it could not only hamper important communications, but could endanger the lives of the fire fighters and victims in the building.

One possible solution to the lack of ability to prioritize messages is to use multiple channels, where each team is assigned a different channel. This solution, however, creates its own set of problems. How does the fire chief determine which channel to listen too at any point in time? How do multiple teams communicate with one another if they are all on different channels? If one team calls for urgent help, how are other teams to know if they are listening to other channels? While multiple channels can alleviate some issues, it can also cause confusion, creating more problems than if a single channel is used.

The lack of management tools that effectively prioritize messages, that allow multiple conversations to take place at the same time, that enable the time-shifting of messages to guarantee delivery, or that support archiving and storing conversations for later retrieval and review, all contribute to the problems associated with tactical radios. In first responder situations, such as with the military, police, and fire, effective communication tools can literally mean the difference between life and death, or the success or failure of a mission. The above burning building example is useful in illustrating just some of the issues with current tactical radio communications. Similar problems exist with the military, police, first responders and others who use tactical communications.

For the reasons recited above, telephone, voicemail, and tactical voice communications systems are inadequate.

SUMMARY OF THE INVENTION

A method for enabling a remote conversation management device to manage conversations on a first communication device. The method includes maintaining a gateway node having a first interface to enable the gateway node to receive conversation control information from the remote conversation management device and a second interface to couple the gateway node to a communication network, where the communication network is configured to support a conversation between a first communication device and one or more other communication devices over the communication network. The method further includes storing in a message buffer the media of the conversation as the media is received through the second interface from the communication network and receiving conversation control information from the remote conversation management device through the first interface. The method further includes managing the rendering of the media of the conversation for the first communication device in response to the received control information from the remote conversation management device by controlling the timing of when the media of the conversation is (i) retrieved from the message buffer and (ii) transmitted over the communication network to the first communication device.

BRIEF DESCRIPTION OF THE DRAWINGS

The invention may best be understood by reference to the following description taken in conjunction with the accompanying drawings, which illustrate specific embodiments of the invention.

FIGS. 2A through 2C are block diagrams illustrating several examples of the different types of legacy network interfaces interacting with the Gateway.

FIG. 10 illustrates the operation of the Multiple Conversation Management System-Simultaneous (MCMS-S) mode according to the present invention.

It should be noted that like reference numbers refer to like elements in the figures.

DETAILED DESCRIPTION OF SPECIFIC EMBODIMENTS

Figure 1:
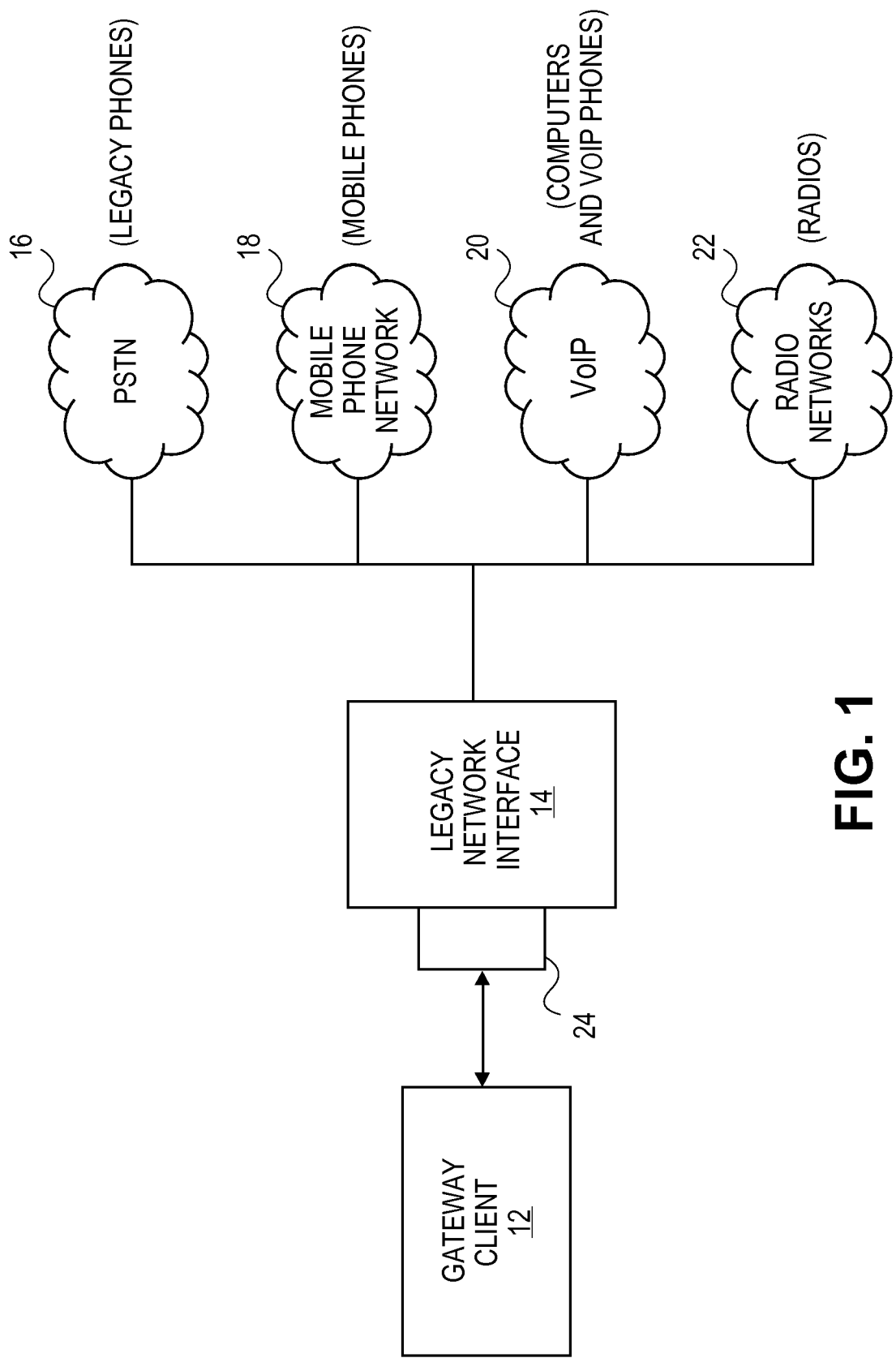
FIG. 1 is a block diagram of legacy communication networks and a legacy network interface interacting with a Gateway client of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

In U.S. application Ser. No. 12/028,400, filed on Feb. 8, 2008 and entitled "Telecommunication and Multimedia Management Method and Apparatus, an improved voice and other media communication and management system and method is disclosed. The system and method provides one or more of the following features and functions: (i) enabling users to participate in multiple conversation types, including live phone calls, conference calls, voice messaging, consecutive or simultaneous communications; (ii) enabling users to review the messages of conversations in either a live mode or a time-shifted mode (voice messaging); (iii) enabling users to seamlessly transition a conversation between a synchronous "live" near real-time mode and a time shifted mode; (iv) enabling users to participate in conversations without waiting for a connection to be established with another participant or the network. This attribute allows users to begin conversations, participate in conversations, and review previously received time-shifted messages of conversations even when there is no network available, when the network is of poor quality, or other participants are unavailable; (v) enabling the system to save media payload data at the sender and, after network transmission, saving the media payload data at all receivers; (vi) enabling the system to organize messages by threading them sequentially into semantically meaningful conversations in which each message can be identified and tied to a given participant in a given conversation; (vii) enabling users to manage each conversation with a set of user controlled functions, such as reviewing "live", pausing or time shifting the conversation until it is convenient to review, replaying in a variety of modes (e.g., playing faster, catching up to live, jump to the head of the conversation) and methods for managing conversations (archiving, tagging, searching, and retrieving from archives); (viii) enabling the system to manage and share presence data with all conversation participants, including online status, intentions with respect to reviewing any given message in either the live or time-shifted mode, current attention to messages, rendering methods, and network conditions between the sender and receiver; (iix) enabling users to manage multiple conversations at the same time, where either (a) one conversation is current and all others are paused; (b) multiple conversations are rendered consecutively, such as but not limited to tactical communications; or (c) multiple conversations are active and simultaneously rendered, such as in a stock exchange or trading floor environment; (ix) enabling users to store all conversations, and if desired, persistently archive them in a tangible medium, providing an asset that can be organized, indexed, searched, transcribed, translated and/or reviewed as needed; (x) enabling the system to provide real time call functionality using a best-efforts mode of message delivery at a rate "good enough" for rendering as soon as possible (similar to UDP), and the guaranteed eventual delivery of exact copies of the messages as transmitted by requesting retransmission of any missing or defective data from the originally saved perfect copy (similar to TCP); and (xi) enabling the system to optimize the utilization of network bandwidth by making tradeoffs between timeliness and media quality, using the presence and intentions of the recipient(s) (i.e., to either review the media in real-time or in a time-shifted mode), as well as measures of network latency, network degradation, packet loss or damage, and/or current bandwidth conditions. For more details on the Telecommunication and Multimedia Management Method and Apparatus, see the above-mentioned U.S. application Ser. No. 12/028,400, incorporated by reference herein for all purposes.

The communication devices in the above-described system include a Multiple Conversation Management System (MCMS) module and a Store and Stream (SaS) module.

The MCMS module enables the user of the device to participate in and organize multiple conversations by allowing the user to perform call set-up functions, such defining the participants of a conversation, creating and editing contact lists, starting, ending, or pausing a conversation, etc. In various embodiments, the MCMS module also allows users to engage in different conversational modes, such selecting one conversation among many for participation (MCMS), consecutively participating in multiple conversations (MCMS-C), or participating in multiple conversations simultaneously (MCMS-S).

The SaS module includes a Persistent Infinite Message Buffer or "PIMB" that stores the media of the various conversations in a time-based format. The stored media includes both the media created on the device itself when the user is engaged in the conversations and the media created by other participants of the various conversations and transmitted over the network to the device. By associating and storing the media of each conversation in the PIMB in the time-based format, the media of each conversation can be rendered either (i) "live" in a near real-time mode as the media is received over the network or (ii) or in a time-shifted mode by retrieving the media of the conversation from the PIMB. The PIMB is therefore a time-shifting buffer, which allows the media of a conversation to be selectively reviewed at a time defined by the user of the device.

Storing the media of conversations in the PIMB also provides a number of other advantages. Rendering control options, such as play faster, play slower, jump to the head of the conversation, jump backward in the conversation, skip over silence or gaps, etc., may be used when rendering the media of a conversation. In addition, the stored media of the conversations can be processed in a number of ways. For example, it can be transcribed into text, translated into other languages, searched, etc. In summary, the combination of the MCMS module and the SaS module embedded in the communication devices provides much of the advantages and functionally of (i) through (xi) described above.

Currently there are millions upon millions of legacy communication devices, such as existing land-line phones, cellular or mobile phones, satellite phones, radios and computers that are unable to engage in the above-described modes of communication. Without the MCMS module or the SaS module embedded in these legacy devices, they are unable to engage in or perform the aforementioned modes of communication.

The present invention is directed to a Gateway client that provides an interface between a legacy communication device and the network it was designed to operate on, such as the Public Switched Telephone Network (PSTN), cellular networks, Internet based or VoIP networks, satellite networks, or other radio or first responder type communication networks. By connecting the Gateway client to the network, much of the above-described MCMS functionality and advantages can be provided to the user without having the MCMS module and the SaS module embedded in the legacy device itself.

The Gateway client provides on the network an MCMS module and Persistent Infinite Message Buffer or PIMB module for the legacy devices. The various features and MCMS functionality are accessed and controlled by a user of a legacy device through a user interface (UI). In various embodiments, the UI is either an application downloaded and running on the legacy device or is a service accessible by the legacy device over the network. All media of a conversation, regardless if it was created by the user of the legacy device or received by the legacy device over the network, is routed through and stored in the time-based format in the PIMB module of the Gateway client. With this arrangement, legacy communication devices may enjoy many of the benefits and advantages of the communication devices described in the U.S. application Ser. No. 12/028,400, while still utilizing the existing network infrastructure for the routing and delivery of the actual voice content or other media of a conversation.

Referring to FIG. 1, a block diagram of a Gateway client 12 interacting with various legacy communication networks is illustrated. The diagram includes a Gateway client 12 interacting with legacy communication networks through a legacy network interface 14. In various embodiments, the legacy networks may include the Public Switched Telephone Network (PSTN) 16, various wireless or mobile phone networks 18 such as cellular, satellite or other mobile phone networks, VoIP networks 20 such as the Internet or other packet-based networks, and radio based networks 22, such police, fire, first responders, taxi/fleet, or the military, or a combination thereof. A signal and media converter 24 is also provided between the Client gateway 12 and the legacy network interface 14. As the above listed networks are well known in the art, a detailed explanation of each is not provided herein.

The signal and media converter 24 is an interface between the Gateway client 12 and the legacy network interface 14. The primary purpose of the converter 24 is to translate media (e.g., voice, video, sensor data, etc.) and signals (such as DTMF signals, caller ID information, telephone numbers, etc.) from the form used on the legacy network 16-22 to that used by the Gateway client 12 and vice versa. The specific conversion performed will depend on the type of legacy network. With PSTN, mobile phone and radio networks 16, 18 and 22 which are circuit based, the converter 24 translates media and signals from the packet domain used by the Gateway client 12 to the signal domain used on the network 16, 18 and/or 22 and vice versa. In other embodiments such as with VoIP network 20, the converter may translate media and signals from one packet type to another packet type and vice-versa. For example, the translation may involve the conversion of IP packets used by the Gateway client 12 to the SIP, RTP protocols used by VoIP networks 20 and vice-versa. In yet another embodiment, the packet based protocol used by the Gateway client 12 and that used on a VoIP or other packet based communication network can be the same. In this situation, the translation of media and signal packets can be altogether avoided or minimized between the two domains.

Figure 2A:
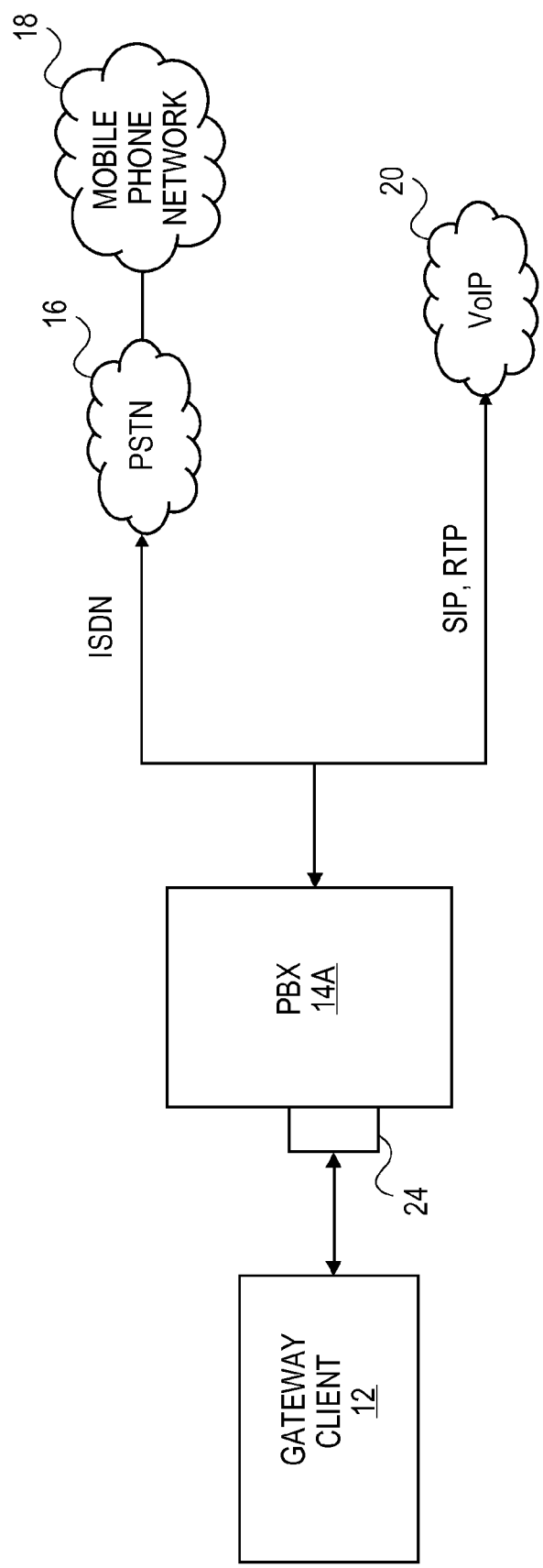
Figure 2B:
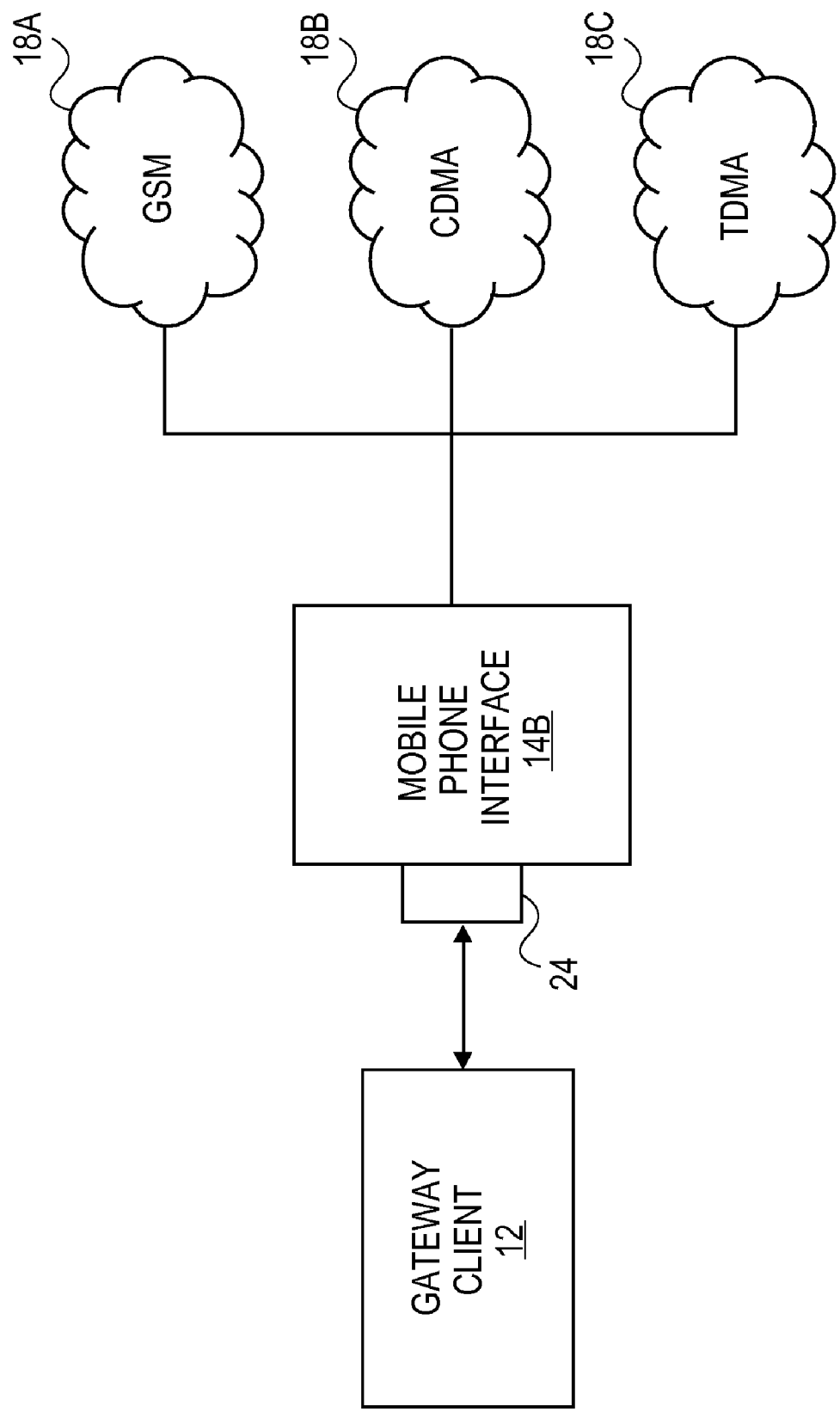

The legacy network interface 14 may include a number of different implementations. FIGS. 2A through 2C illustrate several exemplary embodiments.

Referring to FIG. 2A, a block diagram of a Gateway client 12 connected through a Private Branch Exchange or PBX 14A and a converter 24 to legacy devices operating on either the PSTN 16, mobile phone networks 18 and/or VoIP networks 20. The PBX 14A is a computer-based telephone switch that performs the basic functions of (i) establishing and maintaining a connection (i.e., a circuit) between the legacy communication device and the communication devices of the one or more participants of the conversation; (ii) channeling the voice and other media of the conversation in from and out to the participants over the circuit connection; (iii) disconnecting the circuit connection when the conversation is over; and (iv) optionally performing metering functions for accounting purposes. The PBX 14A may also optionally initiate secondary functions, including call pick-up, conference calls, call forwarding, etc. The internal switching and data processing capabilities of the PBX 14A, as well as the interfaces with the PSTN network 16, the mobile or wireless networks 18 and the VoIP networks 20, are all well known in the art. A detailed explanation is therefore not provided herein.

In one embodiment, an Asterisk® PBX is used. Asterisk® is a well known open-source PBX system which may be used to interface between the Gateway client 12 and the networks 18, 20 and 22 for call switching, managing circuit connections, and enabling many of the aforementioned secondary features as listed above. As an open-source solution, Asterisk® is capable of running on a wide variety of operating systems including Linux, Mac OS, Sun Solaris, and others. Asterisk® is one possible commercially available PBX that may be used in cooperation with the Gateway client 12. It should be understood that Asterisk® is only exemplary and that any type of PBX may be used.

Referring to FIG. 2B, a block diagram of a Gateway client 12 connected through a mobile phone interface 14B and converter 24 to legacy devices operating on various mobile or wireless networks is shown. In this embodiment, the mobile networks may include, but are not limited to, GSM 18A, CDMA 18B, TDMA 18C type wireless networks, or a combination thereof. The mobile phone interface 14B performs essentially the same functions as the PBX 14A, including establishing circuit connections, channeling the media of a conversation over the connection, and disconnecting the connection after completion, as well as other secondary functions such as those listed above.

Referring to FIG. 2C, a block diagram of a Gateway client 12 connected through a radio network interface 14C and converter 24 to legacy devices on radio networks 22. In various embodiments, the radio networks may include fire, police, or other first responder type radio networks, military networks, taxi or fleet radio networks, satellite networks, or a combination thereof. In this embodiment, the radio network interface 14C is a repeater controller, which both receives and transmits radio signals to the radio networks 22.

With each embodiment 2A-2C, the gateway client 12 includes a MCMS module and a PIMB module. The MCMS module allows users to control their conversations with others through a user interface (not illustrated). The PIMB module performs, under the direction of the MCMS module, the functions of: (i) setting up and managing the connection or channel of the legacy communication device with other participants over the appropriate legacy network(s) 16-22 through the legacy network interface 14; (ii) receiving and storing all media, either sent or received through the connection or channel, during the conversation; and (iii) retrieving, mixing, rendering and/or processing the media of the conversation as instructed by the user through the MCMS module. In various embodiments, the user interface may be any interface that allows a user to interact with the Gateway client 12, such as for example, a browser based interface that serves information to the legacy device over a network, a down-loadable application or module that resides on the user's legacy communication device, the Dual-tone Multi-frequency controls on a telephone, or any other type of interface.

Figure 3A:
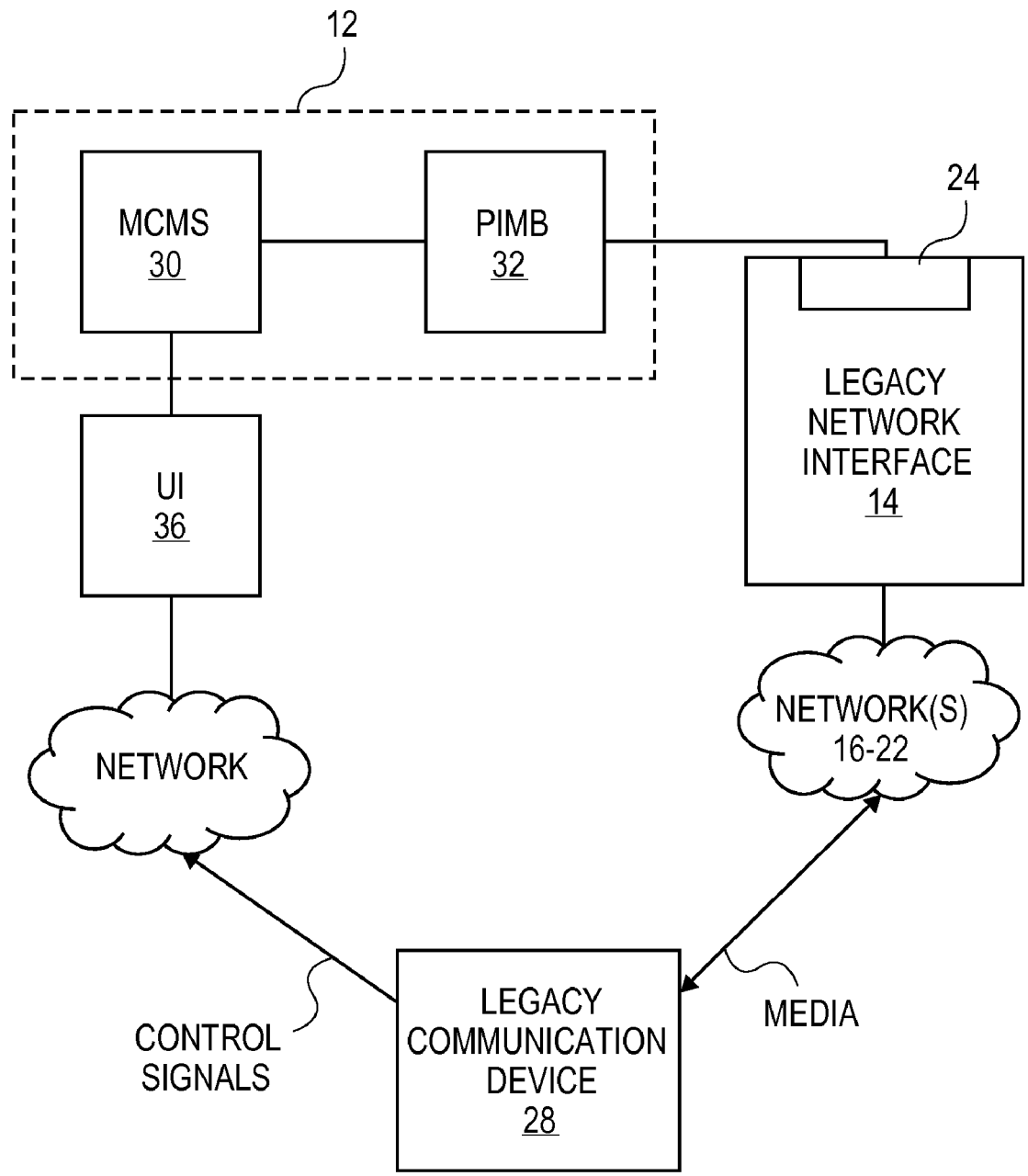
FIGS. 3A through 3F illustrating the flow of control and the media signals between a variety of legacy devices and the Gateway client.

FIG. 3A is a block diagram illustrating the flow of control signals and the media of a conversation between a "generic" legacy communication device 28 and the Gateway client 12. As illustrated in the Figure, the Gateway client 12 includes an MCMS module 30 and a PIMB module 32. The legacy device 28 generates control signals for controlling the MCMS module 30 through a User Interface (UI) 36 over a network. The media of the conversation on the other hand is routed through the appropriate network(s) 16-22 and the legacy network interface 14 to the PIMB module 32 for persistent storage. Specifically, media created on the legacy device 28 is routed through and stored in the PIMB 32 before it is transmitted over the appropriate network to the intended recipient(s). Media intended for the legacy device 28 is first routed through and stored in the PIMB 32 before being transmitted over the appropriate network to the legacy device 28. With this arrangement, two distinct data paths are provided between the legacy device 28 and the Gateway client 12 for (i) control signals and (ii) the media of a conversation respectively. FIGS. 3B through 3E, each of which is directed to a specific type of legacy device, share this feature of distinct data paths.

Figure 3B:
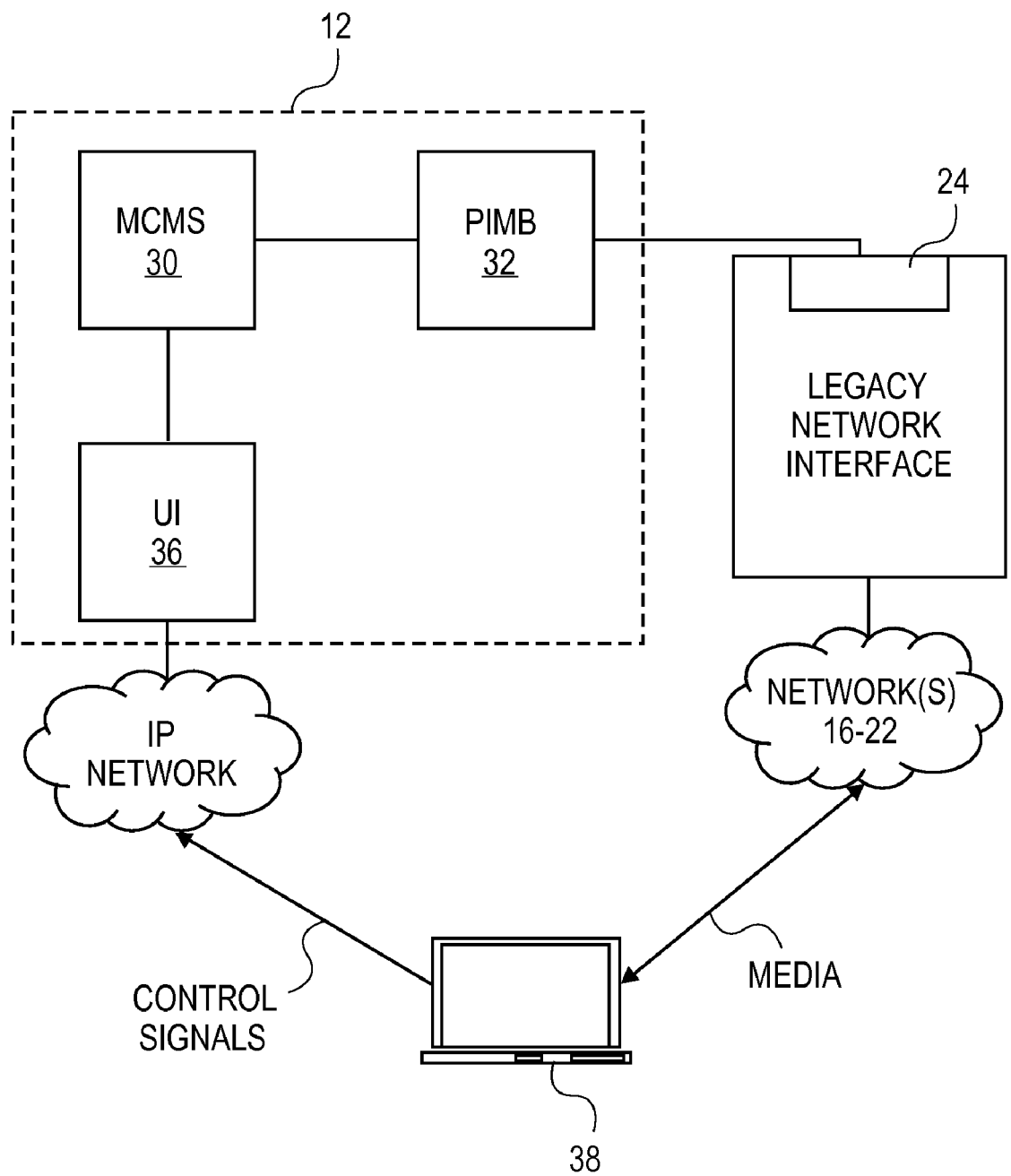

FIG. 3B illustrates an embodiment where the legacy device is a laptop computer 38 with a web browser and the UI 36 is a web server residing on the Gateway client 12. With this embodiment, the web server serves the necessary web pages over an IP network for the user of laptop computer 38 to log into the system and enter MCMS related control signals for setting up and participating in conversations. All media of the conversation, either created by or received by the laptop computer 38, is routed through the PIMB module 32 for persistent storage. In an alternative embodiment, the UI 36 may be a software application that is loaded onto the laptop computer 38 and which cooperates with a web server at the Gateway client 12.

Figure 3C:
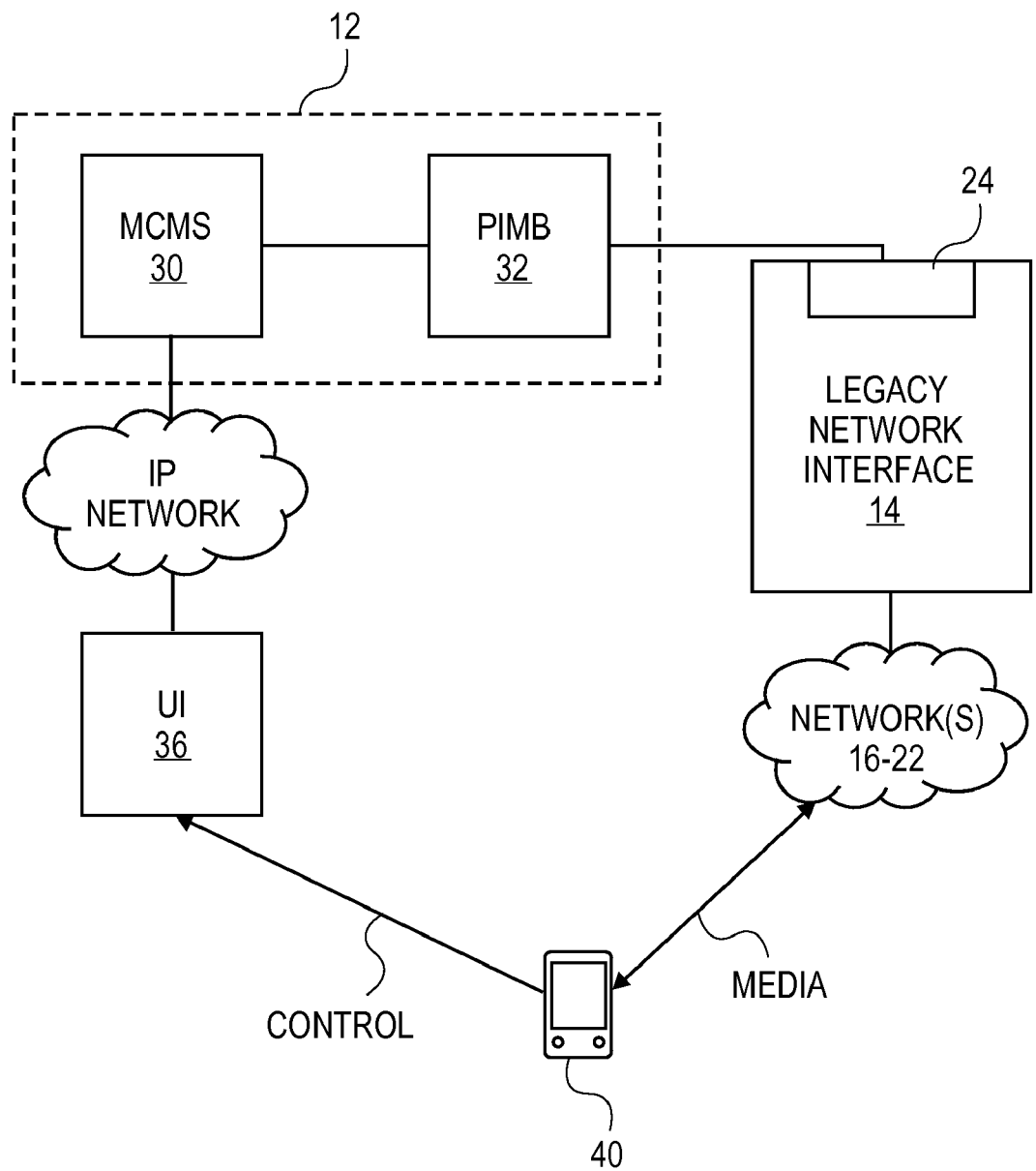

FIG. 3C is an embodiment where the legacy device is a programmable mobile phone 40. In this embodiment, the UI 36 is a software application that is loaded onto the mobile phone 40 and which cooperates with a server located at the Gateway server 12 over an IP network. Control signals for logging into the system, to enter MCMS related control signals, and for setting up and participating in conversations, are all provided to the MCMS module 30 though the UI application 36 on the phone 40. Once a circuit, is established, all media either transmitted or received by the phone 40, is routed through the PIMB module 32 of the Gateway 12 for persistent storage. In an alternative embodiment, the UI 36 can be web server based and reside on the Gateway client 12 and the mobile phone 40 includes a browser to access the web server.

Figure 3D:
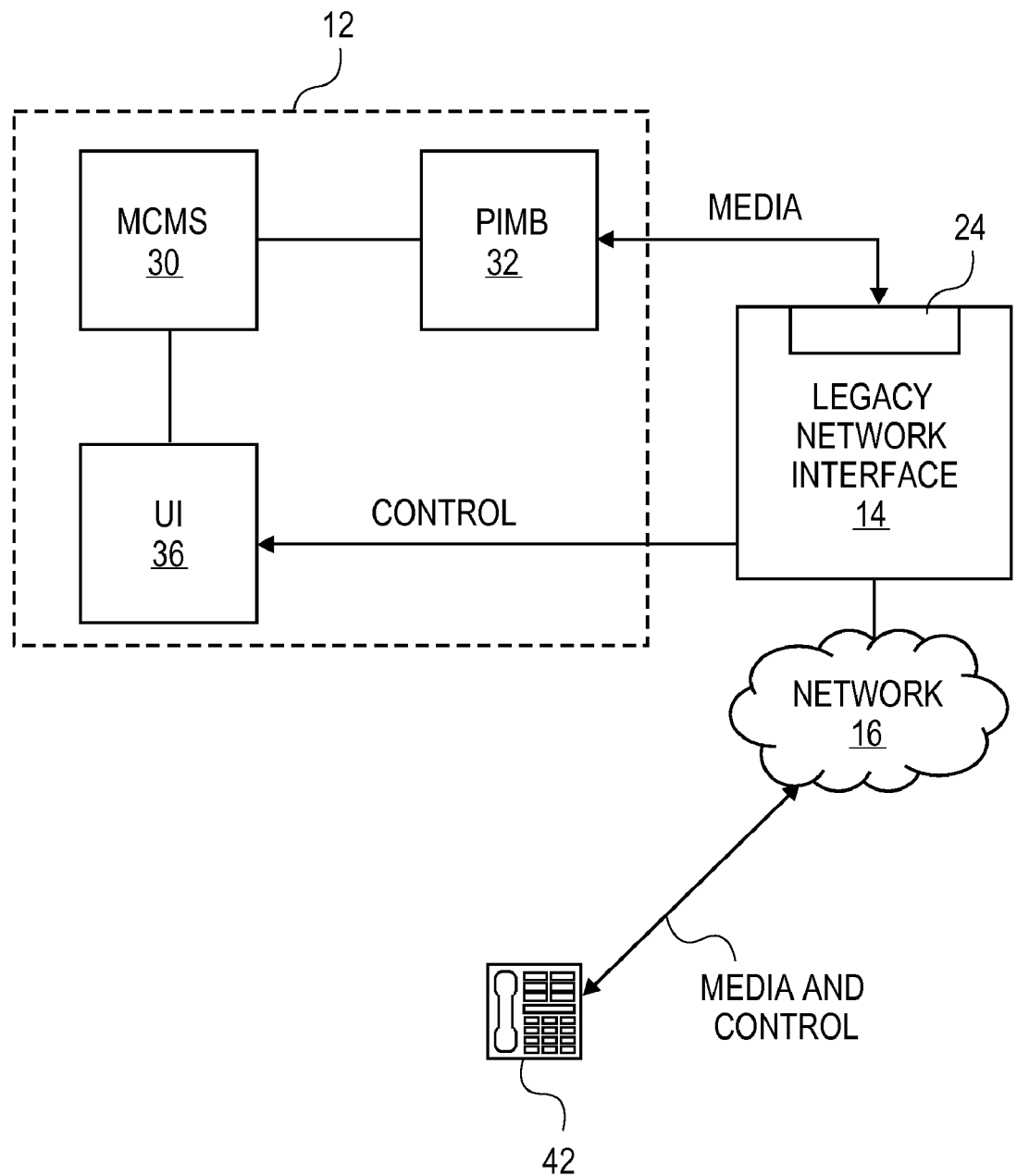

FIG. 3D is an embodiment in which the legacy device is a non-programmable telephone 42, such as a standard land-line telephone or a mobile phone that cannot be programmed. With non-programmable devices, the UI 36 can not be accessed over an IP network. Rather both control signals and the media of conversations need to be routed to the Gateway client 12 through a network, such as the PSTN 16 and a legacy network interface such as a PBX. With this arrangement, media and control signals are provided to the PIMB 32 and the UI 36 of the Gateway client 12 through separate interfaces respectively. The UI 36 may be either voice activated or keypad driven using DTMF based commands, or a combination of the two. For example in response to voice prompts, the user may activate various MCMS commands by either voice and/or keypad entries. By entering various keypad combinations or voice commands, different MCMS functions may be implemented. Again in this embodiment, the media either transmitted or received by the telephone 42 during a conversation is routed through the PIMB module 32 for persistent storage.

Figure 3E:
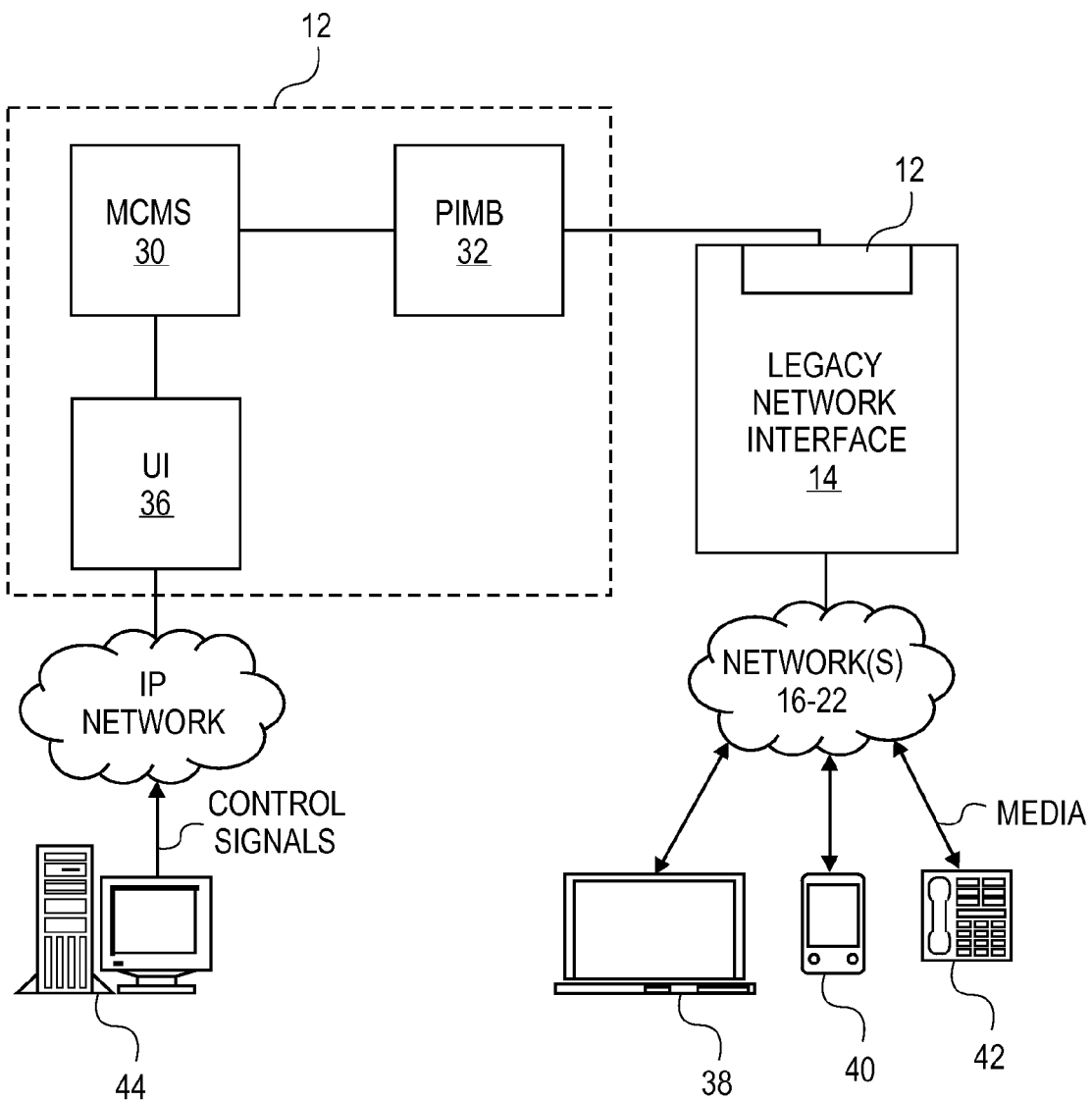

The device used to control the MCMS module 30 is the same as that used to conduct the conversation in each of the above embodiments illustrated in FIGS. 3B to 3D. It should be noted, however, that different devices may be used for the control and the creation and rendering of media functions. As illustrated in FIG. 3E for example, a user may use a desktop computer 44 (or any other type of computer or device) to control the MCMS module 30, while conducting conversations using either their laptop computer 38, mobile phone 40, landline phone 42, or any combination thereof. With this arrangement, a user has the option of managing all their calls on their main computer, while using whatever legacy communication device or devices that may be convenient for conducting actual conversations.

It should be noted that the examples illustrated in FIGS. 3A through 3E are merely exemplary. They should in no way be construed as limiting. Rather, these examples are intended to convey the basic notions that (i) the Gateway server 12 may be used to provide MCMS functionality for a wide variety of legacy devices; (ii) the legacy device used to access and control the MCMS module 30 may be either the same or a different device than what is used to conduct actual conversations; and (iii) two distinct data paths are provided for the signals used to control the MCMS module and the media of the conversation. The data paths could be provided across either the same network or two different networks. Other specific embodiments, which are too numerous to exhaustively describe and illustrate herein, may be implemented within the spirit and scope of the present invention.

Regardless of the specific embodiment, the created or received media of a conversation is persistently stored in the PIMB module 32. With persistent storage, the media of a particular conversation may be rendered on the legacy device either (i) in the near real-time mode as the media is received; or (ii) in the time-shifted mode by retrieving the media from the PIMB module 32 and delivering it to the user over the appropriate network 16-22. The user controls and manages their conversations through the UI 36 and the MCMS module 30. For example, the user may set up a conversation, engage in a selected conversation in either the near real-time or time-shifted modes, transition between conversations, participate in multiple conversations either consecutively (MCMS-C) or simultaneously (MCMS-S), control the rendering of the media of conversations (i.e., play faster, play slower, jump to the head of the conversation, jump backward in the conversation, skip over silence or gaps, etc.), or process (i.e., transcribe, translate, etc.) the stored media of a conversation.

Figure 3F:
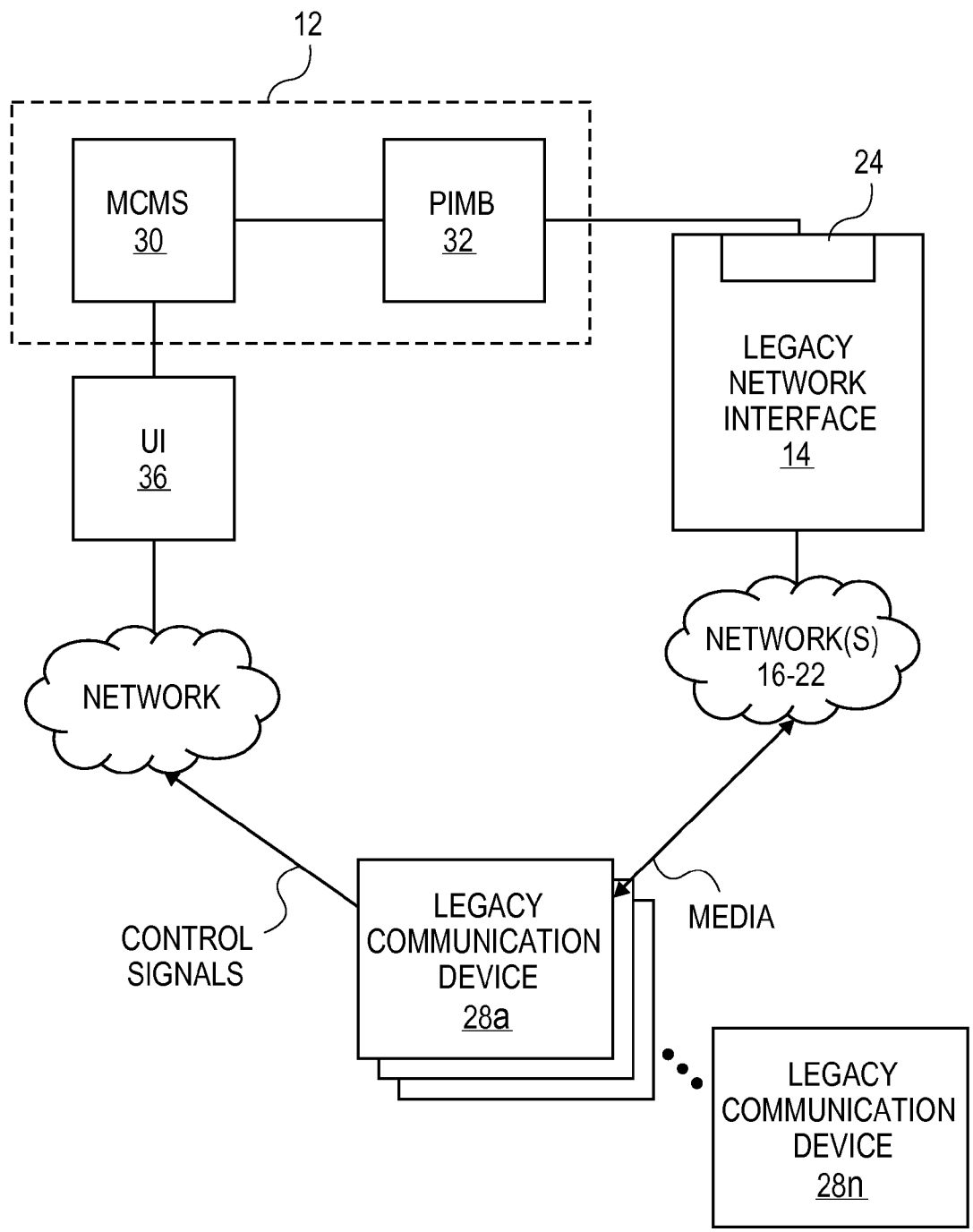

The Gateway client 12 illustrated in FIGS. 3A through 3E serve only one user. It should be understood that only one user is described and illustrated for the sake of simplicity. In most actual embodiments, each Gateway server 12 may serve multiple users. Referring to FIG. 3F for example, the Gateway client 12 is illustrated serving multiple users, each using a different legacy communication device 28a through 28n. Although not illustrated, the users of multiple computers 38, mobile phones 40, and land-line phones 42 can be supported by the Gateway clients 12 illustrated in FIGS. 3B through 3E respectively.

A. The User Interface (UI)

Figure 4A:
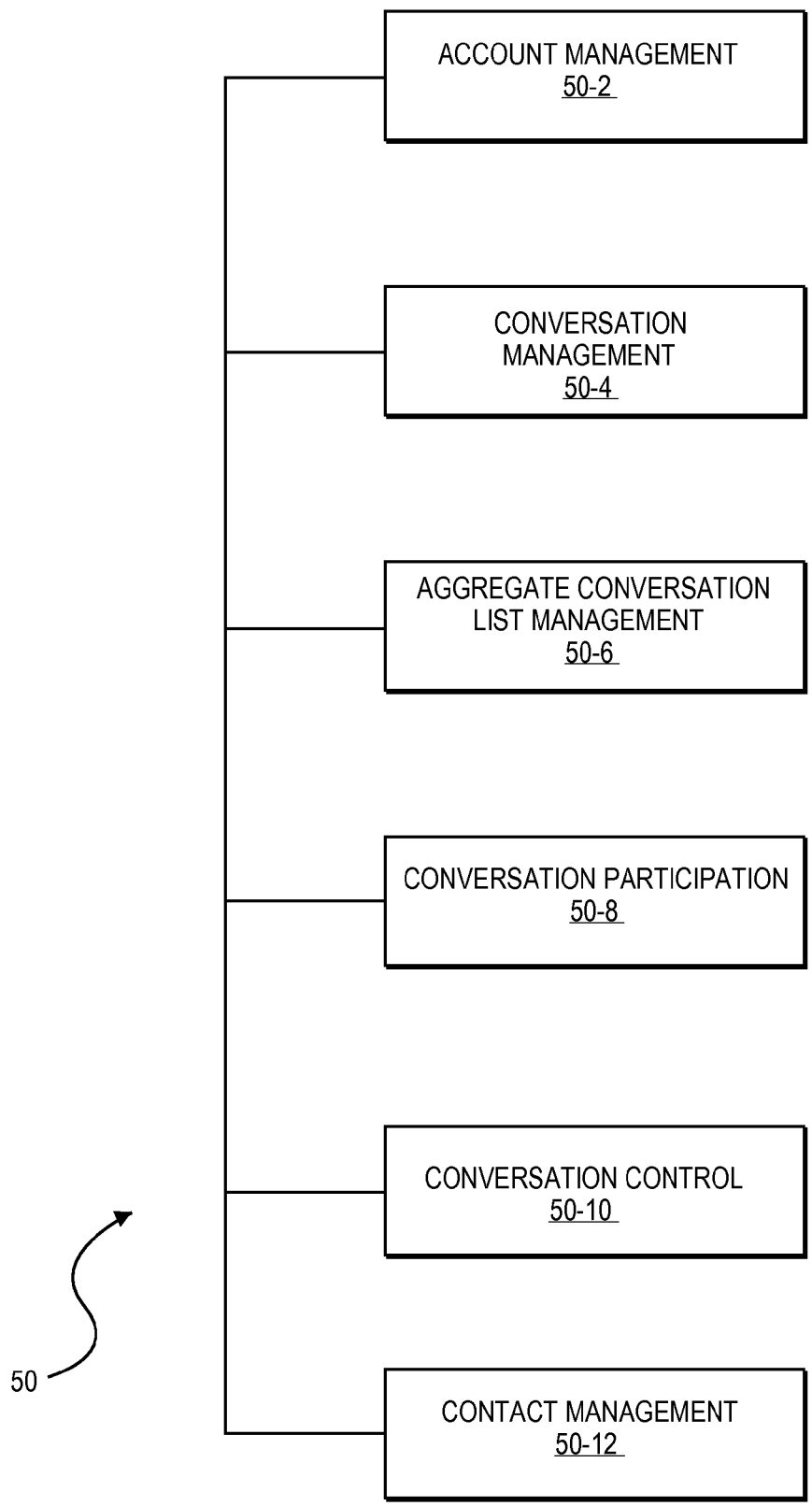
FIGS. 4A through 4F illustrate a host of conversation controls that a user may implement through a Gateway client.

A user may implement a host of controls through the UI 36. These controls may be grouped into like functions. Referring to FIG. 4A, a diagram 50 illustrating the major groups of control functions is illustrated. The major functions include account management 50-2, conversation management 50-4, aggregate conversation list management 50-6, conversation participation 50-8, conversation controls 50-10, and contact management 50-12. After accessing the UI 36, the User may implement the various management functions, described in detail below. The discussion herein is exemplary and is not intended to be an exhaustive explanation of the MCMS functionality, but rather is intended to provide just an overview of some of the MCMS attributes.

A.1 Account Management

Under the account management function 50-2, a user may change certain settings and preferences. A user may change their email address, password, name, phone number, phone password, call-in number, default and/or user defined rendering speeds, tags, gain or volume levels for reviewing messages, etc. To make these changes, the user enters the appropriate commands through the UI 36. The MCMS module 30 responds by storing status information in the Gateway client 12.

A.2 Conversation Management

Figure 4B:
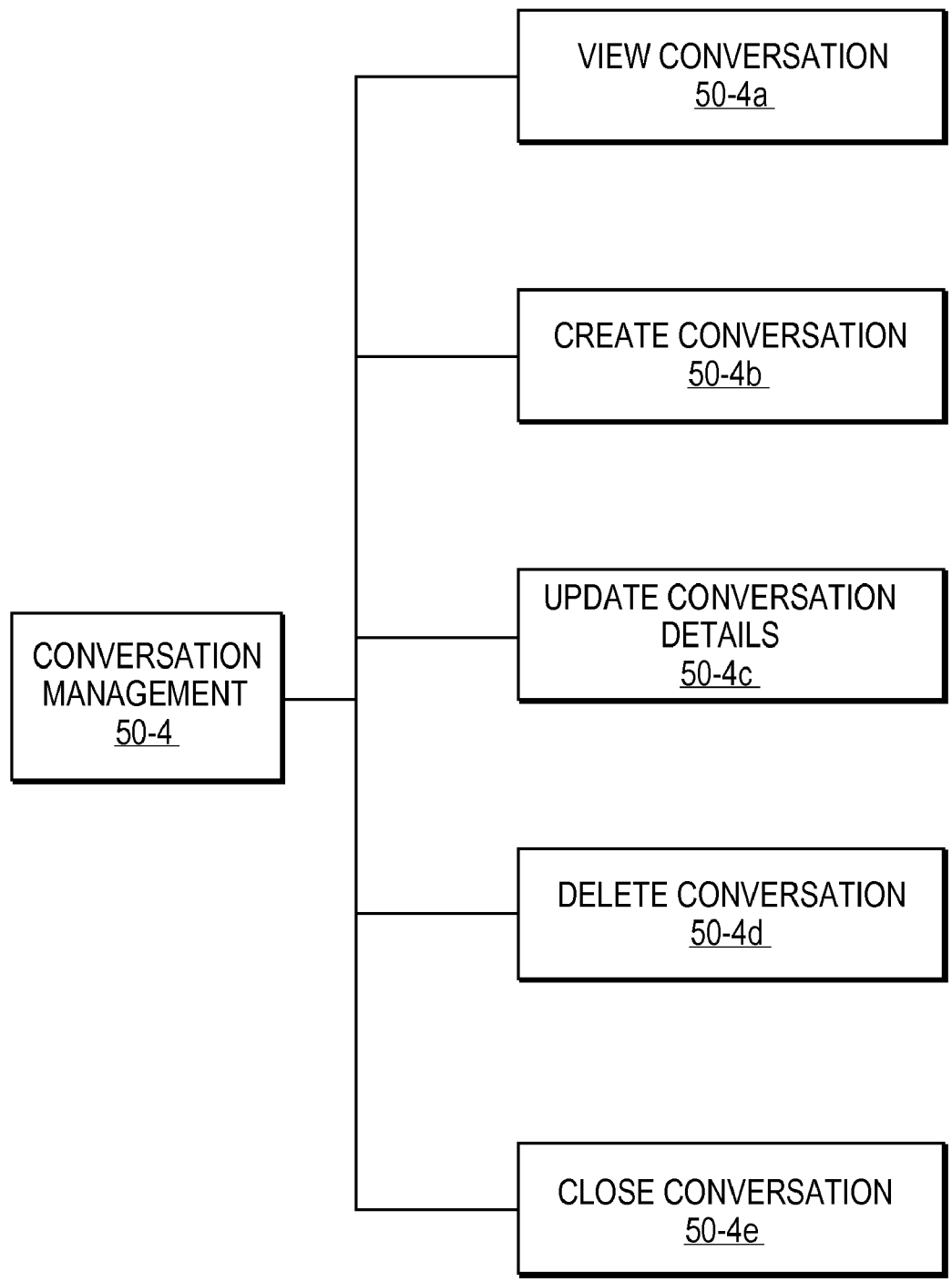

As illustrated in FIG. 4B, conversation management 50-4 is a set of functions that allow a user to view their aggregate conversation lists, create a new conversation, update the details of a conversation, delete a conversation, and close a conversation. Each of these functions is described below.

View Conversations 50-4a—For each conversation, the MCMS module 30 provides the user with one or more of the following attributes: the name of the conversation, the actual start time, the last activity, tags, duration, and the list of participants. For each participant, the name and/or phone number, status (live, other conversation, catch-up-mode, offline-reachable, offline-unavailable, etc.) is provided.

Create a Conversation 50-4b—A user creates a conversation through the UI 40 by entering a conversation name, a list of contacts, and an optional scheduled start time. If no start time is designated, it is assumed the start time is immediate. In response, the MCMS module 30 creates a new conversation and associates the records for each participant on the contacts list. The MCMS module 30 also creates participant records for each user on the contact list, allowing the caller to receive the presence information of the others on the contact list. If the conversation is scheduled, the MCMS module 30 starts the conversation at the designated time. Otherwise, the conversation starts right away.

Update Conversation Details 50-4c—The user may make changes to a conversation through the user UI 36. For example, participants of a conversation may be added or removed. Any change in status of the participants is updated in the MCMS module 30.

Delete a Conversation 50-4d—A user may delete a specific conversation from their list of conversations through the UI 36. In response, the MCMS module 30 notes the change and designates the conversation as deleted.

Close a Conversation 50-4e—A user may elect to terminate or close a conversation. In one embodiment, only the user that created a conversation can elect to terminate that conversation.

A.3 Aggregate Conversation List Management

Figure 4C:
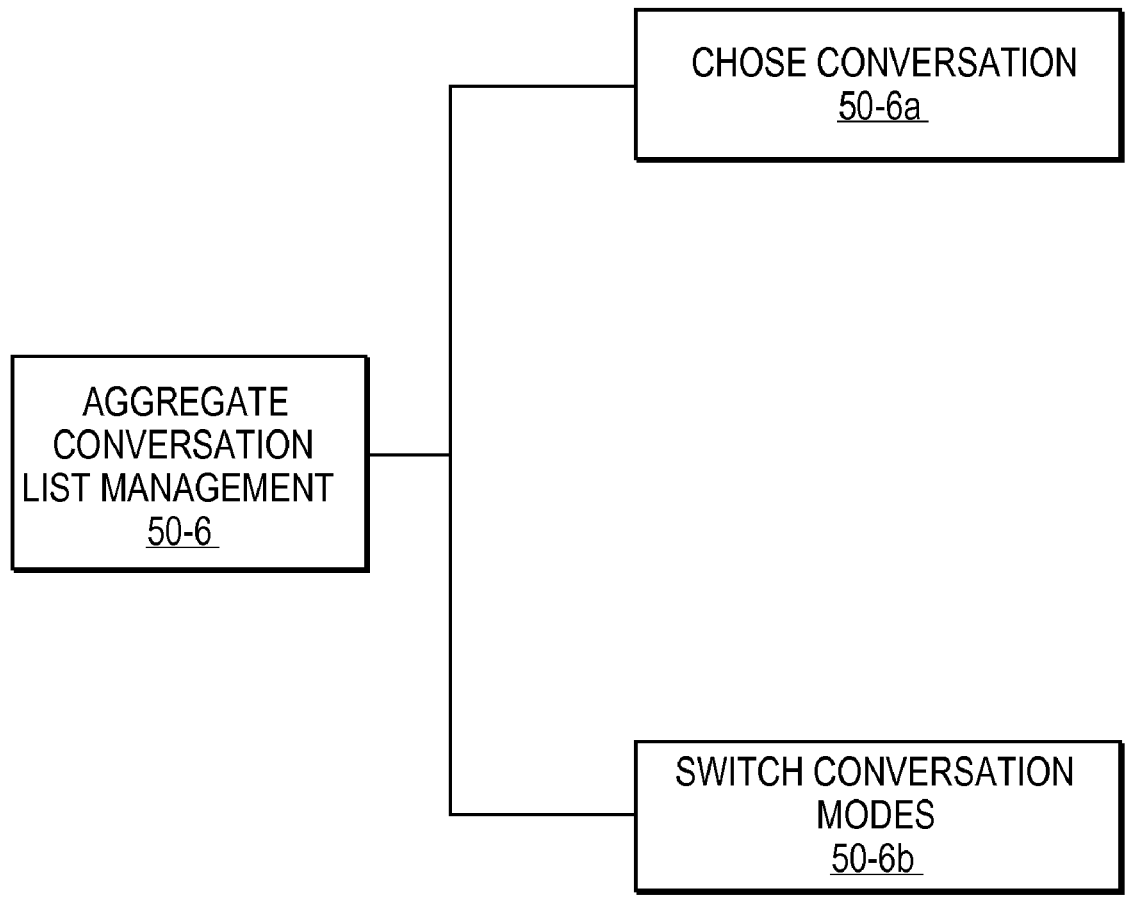

As illustrated in FIG. 4C, the aggregate conversation list management 50-6 is a set of functions that allow the user to engage in multiple conversations (i.e., the user's aggregate conversation list). The aggregate conversation list management functions allow a user, through the UI 36, to participate in one conversation "live" or in the near real-time mode, while participating in other conversations in a time-shifted mode.

Chose Conversation 50-6a—Through the UI 36, the user may select one conversation among the user's aggregate conversation list as current. The user may also control or transition the rendering of the media of the current conversation between the near real-time mode and the time-shifted mode. The user may also switch the current conversation among the aggregate conversation list from time-to-time.

Switch Conversations Modes 50-6b—In an optional embodiment, the user may be able to switch between different MCMS, MCMS-C and MCMS-S modes of operation, which are described in more detail below.

A.4 Conversation Participation

Figure 4D:
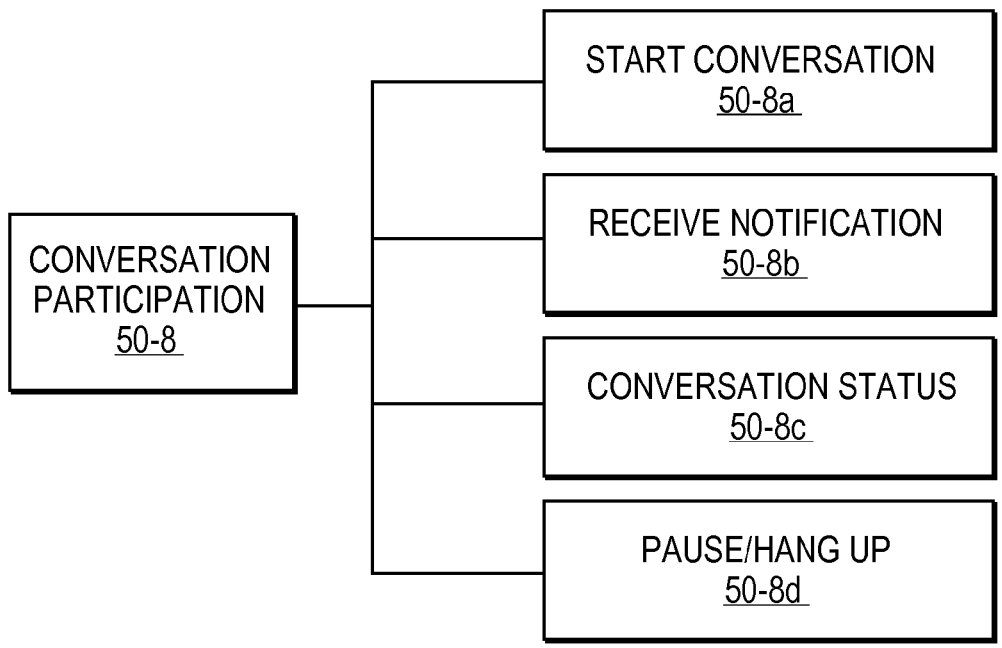

As illustrated in FIG. 4D, conversation participation is a set of functions 50-8 that allow a user to start a conversation, receive a notification to join a conversation, obtain conversation status information, and hang up on a conversation.

Start a Conversation 50-8a—After a conversation has been created, the status of each participant is checked. If a participant is offline, then an effort is made to contact that person. If a participant is online but engaged in another conversation, then the MCMS module 30 notifies that participant that their presence is requested. The presence status of all online participants is updated and maintained in the MCMS module 30.

Receive a Notification 50-8b—The Gateway client 12 may notify a user that their attention has been requested on a conversation through a graphic display and/or audible notification via the UI 36.

Conversation Status 50-8c—A user may request the status of a conversation through the UI 36. In response, the MCMS module 30 assembles the status information and presents that information to the user.

Conversation Pause/Hang Up 50-8d—Through UI 36, a user may pause or hang up on an active conversation. In response, the MCMS module 30 updates the user's participant status for the conversation. The MCMS module 30 will also direct the PIMB module 32 to remove the user from the conversation if the user has hung up on the conversation. If the user has paused the conversation, the PIMB module 32 will continue to store the media of the conversation during the pause.

A.5 Conversation Controls

Figure 4E:
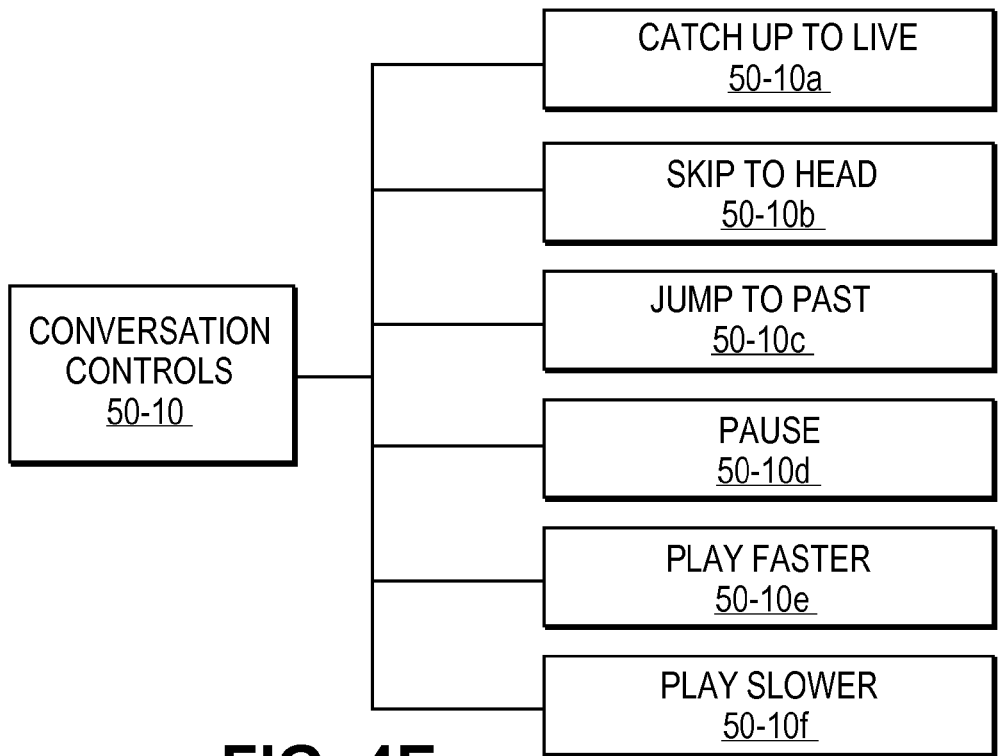

As illustrated in FIG. 4E, conversation control 50-10 is a set of functions that allow a user to control their participation in a conversation. These functions, which are initiated by the user through the UI 36, allow a user to catch-up-to-live, skip to the head of a conversation, jump to a past location, pause, play faster and play slower, etc.

Catch-up-to-live 50-10a—A user may catch-up-to-live (CTL) in an ongoing conversation using a "CTL" input function. When this function is activated, the MCMS module 30 checks the last point in the conversation the user has reviewed and directs the PIMB module 32 to render the media not previously reviewed using a rendering option that is faster than the media was originally encoded when created. When the rendering of the stored media catches up to the "live" media as it is being received over the network, rendering is seamlessly transitioned from the time-shifted to the near real-time modes. A user may speak or otherwise contribute media to the conversation when at the head of the conversation.

Skip to Head 50-10b—This function enables a user to jump to the head of a conversation, skipping over any intervening media between the current point of the user in the conversation and the head of the conversation. When implemented, the MCMS module 30 instructs the PIMB module 32 to immediately render the media at the head of the conversation. (If the head of the conversation is currently live, then the effect of this command is to Jump to Live (JTL). A user may speak or otherwise contribute media to the conversation when at the head of the conversation.

Jump to past 50-10c—This function enables a user to jump back to a previous point in a conversation, similar to a rewind or replay function. When implemented, the MCMS module 30 instructs the PIMB module 32 to render media of the conversation starting from the rewind point.

Pause 50-10d—This function enables the user to pause the reviewing of the media of a conversation. In response, the PIMB module 32 stops the rendering of media until another command is issued.

Play faster 50-10e—This function enables a user to render media of a conversation faster than it was originally created and encoded. In response, the PIMB module 32 renders the media at a faster rate than it was originally encoded. The rendering rate may be either selected from a number of preset options or defined by the user.

Play slower 50-10f—This function enables a user to render media slower than it was originally encoded. In response, the PIMB module 32 renders the media at the slower rate. The rendering rate may be either selected from a number of preset options or defined by the user.

A.6 Contact Management

Figure 4F:
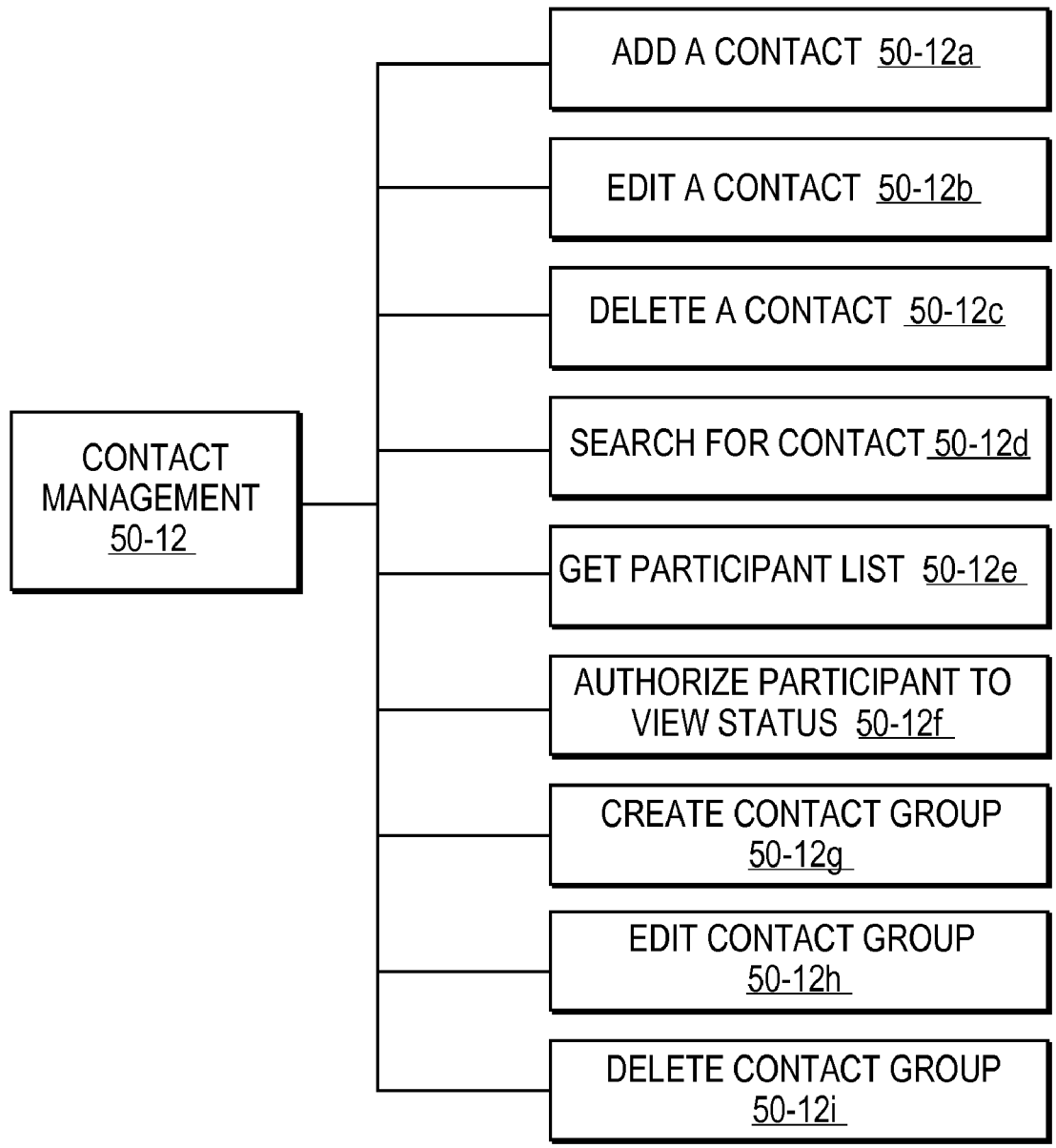

As illustrated in FIG. 4F, the MCMS module 30 provides the user with a host of functions for managing contact lists and user groups. These functions include the adding, editing, deleting of contacts and user groups. Each of these functions are implemented by a user though the UI 36. Any revisions or deletions in a user's contact list or group list is stored in the MCMS module 30.

Add a Contact 50-12a—This function enables a user to add a new contact to their contact list. The new contact can be either a registered user or an external contact. Typically the name, phone number(s), type of number (cell, office, home, computer, etc.), email address and other personal information are provided for each contact record.

Edit a Contact 50-12b—This function enables a user to edit or update an existing contact record.

Delete a Contact 50-12c—This function enables a user to remove or delete an existing contact record.

Search for a Contact 50-12d—This function enables a user to search for a specific contact in their contact list. The search may be conducted using a number of criteria, such as name, phone number, most recently called, most frequently called, group, etc.

Get a Participant list 50-12e—This function enables a user to search and retrieve a list of participants of a conversation by a number of different search criteria, including for example, by name, most recent outgoing calls, most recent incoming calls, most frequently called, etc.

Authorize a caller to review status 50-12f—This function enables a first user to authorize other users to view the first user's status. Non-authorized users may not view the status of the first User.

Create a Group of Contacts 50-12g—This function enables a user to associate a number of contacts into a group. When a user defines a group, the contact list in that group is stored in the MCMS module 30.

Edit a Group 50-12h—This function enables a user to edit a group, or update the contact information for a member of the group.

Delete a Contact Group 50-12i—This function enables a user to delete a group.

B. The MCMS Module

Figure 5:
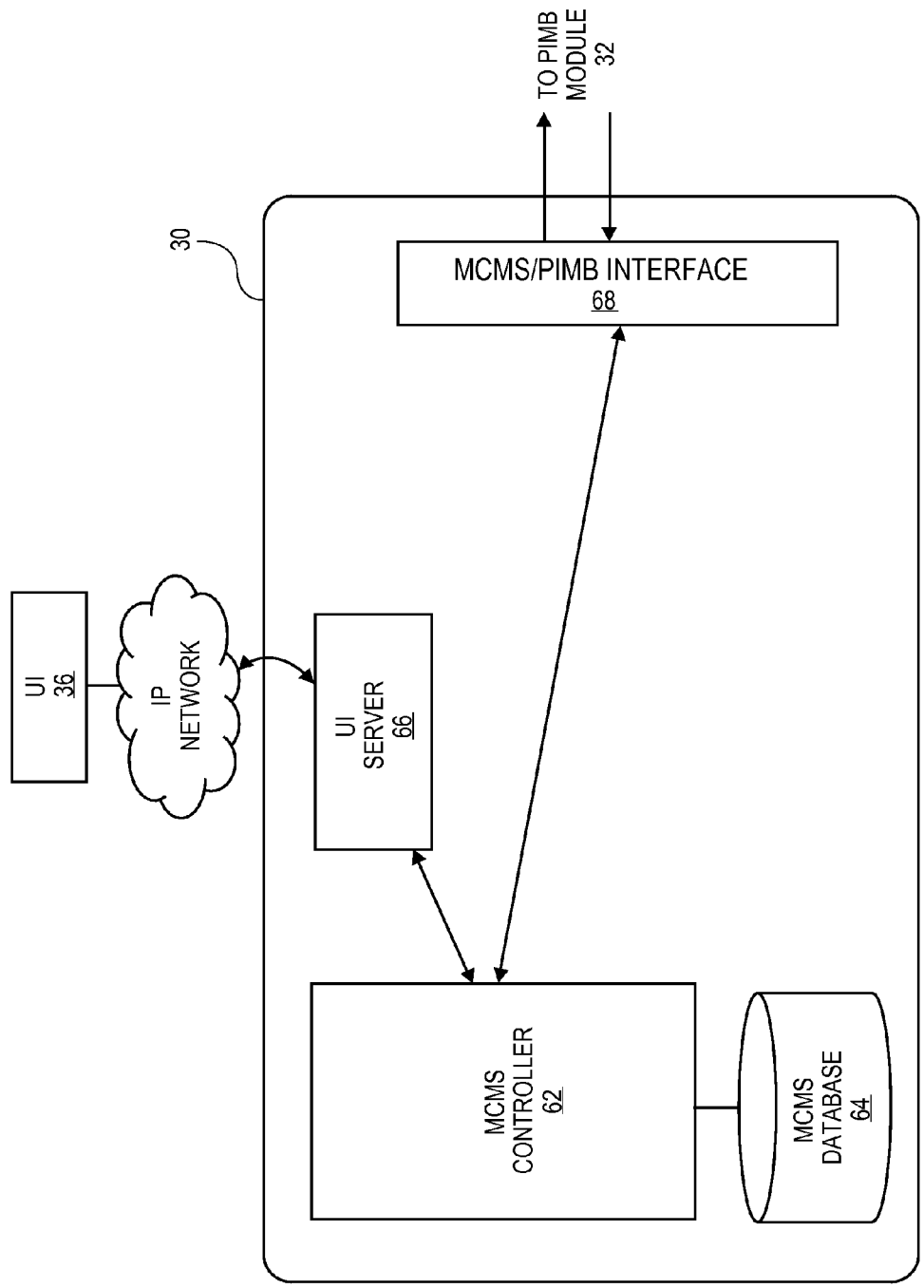
FIG. 5 illustrates a block diagram of a MCMS module of the Client gateway.

Referring to FIG. 5, a block diagram of the MCMS module 30 of the Gateway client 12 is shown. The MCMS module 30 includes an MCMS controller 62, an MCMS database 64, a UI server 66, and a MCMS/PIMB interface 68. Each of these elements is described in detail below.

B.1. The MCMS Controller

The MCMS controller 62 performs three main functions. The MCMS controller 62 responds to control input commands from the user received by the UI server 66. These commands are typically used for logging into the system, conversation set up, and conversation control. Conversation controls include, for example, rendering controls such as play faster, play slower, catch up to live, jump to head, start new conversation, end a conversation, etc. The MCMS controller also sends messages to the PIMB module 32, through the MCMS/PIMB interface 68, to manage conversations based on the input commands received from the user. The messages are in the form of signals understood by the PIMB module 32 that contain the instructions included or defined by the input commands received from the user. Lastly, the MCMS controller 62 receives messages from the PIMB module 32. These messages typically pertain to conversation status, such as the user has started speaking or stopped speaking (i.e., silence detection), the user has hung up, or the position of the user reviewing the media of the conversation relative to the head of the conversation. In response, the MCMS controller 62 sends messages to the UI server 66, which in turn serves the conversation status information to the user. The MCMS controller 62 is also responsible for storing in the MCMS database 64 all commands and status information for each conversation in which the user is a participant.

B.2. The MCMS Database

The database 64 stores and manages the persistent meta data for a number of entities, including contacts and participants, conversations and messages (live and stored), and default priorities. In addition, the MCMS database 64 stores the moment-to-moment operational data of a user's conversations, presence, and status, as well as that of all the participants conversing with the user or on the user's contact list. For example, with regard to conversations and messages, the database 64 keeps track of status information, such as what messages of a conversation a user has or has not reviewed, priorities, and catch up to live status for each conversation in which the user is a participant, and the presence and status of other participants.

B.3. The UI Server

The UI server 66 is responsible for serving web based applications, such as web pages and or Flash, for embodiments where the UI 36 is web based or the UI is an application that is loaded onto the legacy device. The UI server 66 operates under the management of the MCMS controller 62. Information to be presented to the user is served by the Gateway client 12 through the UI server 66. Alternatively, input commands are received from the user through the UI server 66 and provided to the MCMS controller 62.

B.4. MCMS/PIMB Interface

The MCMS/PIMB interface 68 is responsible for managing bi-directional communication between the MCMS module 30 and the PIMB module 32. The interface 68 includes a set of function calls which are passed back and forth and that enable communication and coordination between the two modules.

B.5. MCMS Application Operation

MCMS module 30 supports different modes of engaging in conversations and/or managing multiple conversations using a variety of media and data types (voice, video, text, location, data, etc.). Users with legacy communication devices may engage in conversations by sending messages to designated participants using their legacy devices and receiving messages from the other participants. Depending on preferences and priorities, the user may review received messages in near real-time, or they might simply be notified that the message is ready for review. Users can transition from a series of back and forth messages, which are reviewed in a time-shifted mode or in a near real-time conversation mode (similar to a full duplex or standard "live" phone call) conversation and then back to time-shifted mode again. The MCMS module 30 allows a user to control their interactions with their most important conversations in real-time without missing any messages in other ongoing conversations. For example, the MCMS module 30 may notify a user of urgent or high priority communications from a conversation in which the user is not currently an active participant.

C. The PIMB Module

Figure 6:
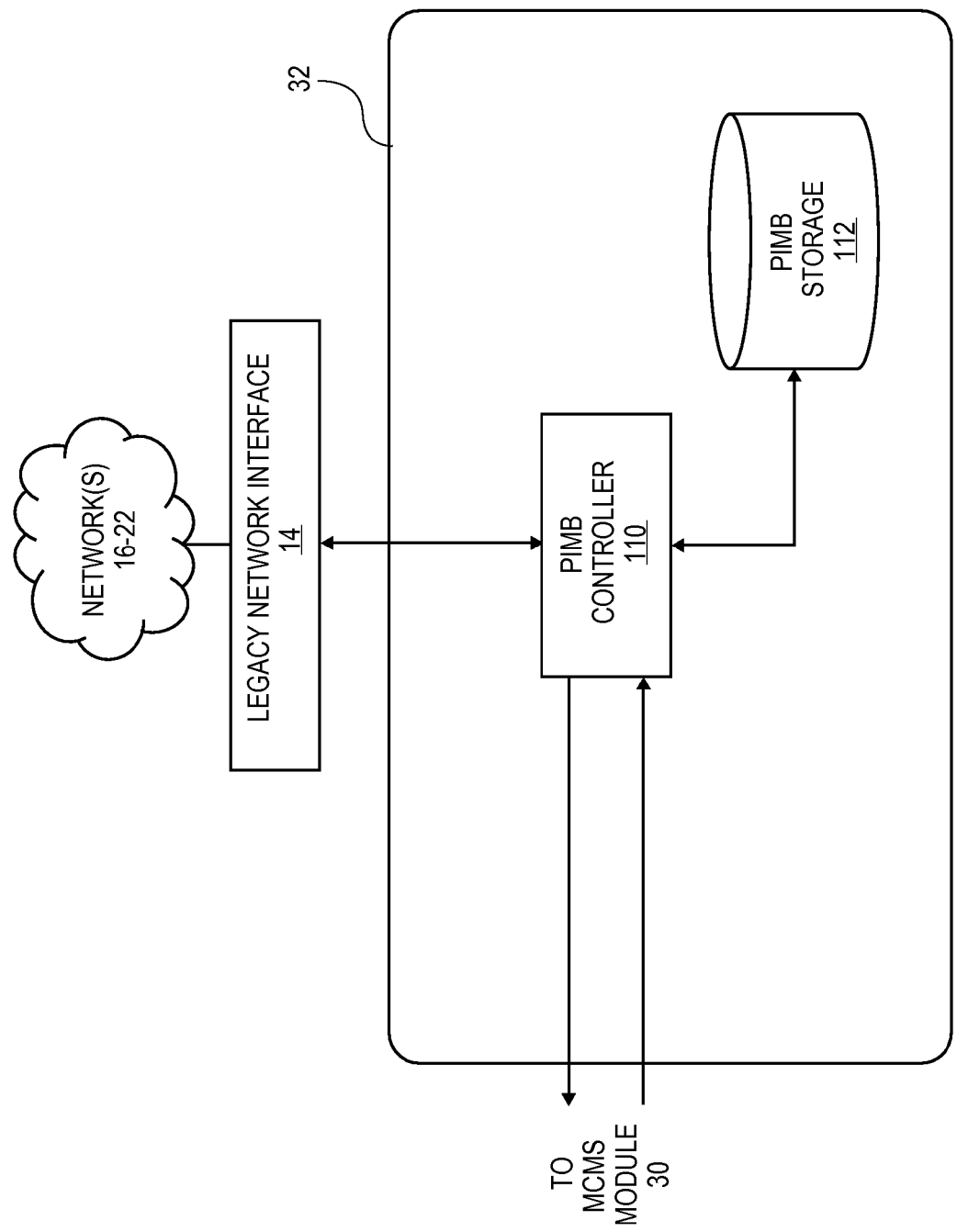
FIG. 6 is a block diagram of a Permanent Infinite Message Buffer (PIMB) module of the Gateway client.

Referring to FIG. 6, a block diagram of the PIMB module 32 of the Gateway client 12 is shown. The PIMB module 32 includes a PIMB controller 110 and PIMB storage 112. Both of these elements are described in detail below.

B.1. The PIMB Controller

The PIMB controller 110 is responsible for receiving and storing all the media of conversations in the PIMB storage 112. When a circuit is established, the media of the conversation, regardless if it was transmitted or received by the legacy device, is stored in the PIMB 112 by controller 110. The controller 110 is also responsible for retrieving media from the PIMB when needed. If the user has requested the review of media of a conversation in the time-shifted mode, then controller 110 is responsible for retrieving the media from PIMB storage 112 and sending it to the legacy device through the legacy network interface 14 and the appropriate network 16-22. The PIMB controller 110 further is responsible for receiving messages from the MCMS module 30 for conversation control (e.g., dialing a telephone number, hanging up, interpreting error conditions or busy signals, etc.) and for the controlling of media of the conversations (i.e., mixing of media, render faster, render slower, jump to live, catch up to live, etc.) as input by the user through the MCMS module 30. Lastly, the PIMB controller is responsible for sending messages to the MCMS module 30 regarding the activity on the different circuits in which the user may be connected. These messages may include information such as the user has hung up, an incoming call has been detected, an incoming DTMF command has been detected, silence detection, etc.

B.2 Persistent Infinite Message Buffer (PIMB)

PIMB storage 112 is a set of indexed (i.e., time-stamped and sequentially numbered) media payload data structures and a system for their storage and retrieval. In one embodiment, the data in the PIMB storage 112 is arbitrarily persistent, meaning it is available virtually forever or at least until the system runs out of storage. Various retention rates and strategies may be employed to make effective use of storage resources. Many possible implementations exist for the physical storage implementation of the PIMB storage 112, including, but not limited to: RAM, Flash memory, hard drives, optical media, or some combination thereof. PIMB storage 112 is also "infinite" in size, meaning the amount of data that can be stored is not inherently limited. In one specific embodiment, PIMB storage 112 may be implemented using a small and relatively fast RAM cache coupled with a hard drive or optical media for persistent storage. As the physical capacity of this storage is exceeded, data is backed up and maintained on archival storage (not shown) for later retrieval on demand. User criteria or a replacement algorithm, such as least-recently-used, or first-in-last-out, may be used to dictate the actual data stored in storage 112 and the data that is archived. The PIMB storage 112 further provides the attributes of file system storage and the random access attributes of a database. In an alternative embodiment, the PIMB storage 112 is implemented using an SQL database.

Any number of conversations, regardless of their duration or the number of messages in each, may be stored in the PIMB 112 and later retrieved for review. In addition, the meta data associated with the messages of a conversation, such as its originator and its length, may be also stored in PIMB storage 112. In alternative embodiments, the indexed media payloads and other data can be stored for a designated period of time (e.g. 30 days). Once the age of the media exceeds the designated period, the payloads and data are archived. In another embodiment, payloads can be discarded based on the sender and/or the recipient of the message containing the payload, or the topic of the conversation or messages associated with the payload. In yet other embodiments, certain payloads and data may be marked for transience, meaning the media will not be stored in PIMB storage 112.

The terms "persistent" and "infinite" as used herein should not be construed literally as absolute terms. A user may wish to indefinitely store some media that is considered important. In other situations, such as a casual chat between two friends, the media may be deleted after a certain period of time or not stored at all to save storage space. According to various embodiments of the invention, different retention policies may be used, either set by an administrator of the Gateway client 12 or configured by the user. The use of the word "infinite" refers to the lack of any preset time boundaries enforced by the PIMB module 32. This is contrasted with current jitter buffer systems, where media is discarded after it has been rendered. The terms persistent and infinite should therefore be broadly construed to mean that the PIMB module 32 has no limitations on the time ranges and quantities of media that can be stored therein.

There are a number of advantages to archiving the media of conversations in a persistent storage medium. Voice messages and other media can be organized, indexed, searched, transcribed, translated, and reviewed as needed. Voice, as well as other media, therefore becomes an asset that can be managed.

D. Conversations

The MCMS module 30 supports a number of different types of conversation modes, such as the near real-time where the messages are reviewed "live" without any perceptible delay, time-shifted where participants exchange messages back and forth with a delay between the messages, "live" conference calls involving multiple participants, standing conference calls at a regularly scheduled times, or configurable structured conversations such as a simultaneous briefing, where each participants leaves a message briefing beforehand for others to review before everyone joins the live conference call.

Yet another unique attribute of the MCMS module 30 is the ability for users to transition between the different types of conversations. For example, the participants can seamlessly transition from voice-messaging in the time shifted mode to a "live" near real-time mode conversation and back again. By varying the delay between messages, the participants can effectively flow between the two modes as best suit their needs or desires. In yet another alternative, the participants of a near real-time conference conversation can transition to a voice-messaging mode and send updates or action items to each other after the live call is over. While several examples have been noted, it should be understood that the features and functions of the MCSM module 30 is extremely flexible and provides numerous options to transition between different types of conversations. The above examples should therefore not be construed as limiting.

As noted above, conversations consist of messages maintained in their original time order and sequence. The media of each message associated with a conversation is persistently stored in the PIMB module 32 in time and sequence order. In this manner, the messages of a conversation can be retrieved from the PIMB and rendered at a time chosen by the user.

A sent message either belongs to an existing conversation or begins a new conversation. A typical conversation includes a set of messages that are organized around a defined subject matter, topic, time, list of contacts, or group. For example, conversations may involve a common group of people such as the members of a club, a company may have a standing conversation at a fixed time, such as a weekly sales meeting, or friends may have ad-hoc conversations on various topics, such as making dinner plans.

Each conversation is defined by a set of attributes, including a name, a list of participants, begin and end time, and state including at pending, active, or terminated. Other conversation states are possible in other embodiments.

The relationship between a participant and a conversation also has attributes. These attributes include, but are not limited to, priority, status (states of participation in a conversation). The values of participant status may include active, participation in more than one conversation at a time, reviewing a conversation in a time-shifted mode, Catching Up To Live, passively participating (i.e., not actively reviewing, but receiving high priority messages), standby, or ignoring a conversation (i.e., declined to participate or record the conversation).

From a recipient's perspective, a user may select or define the relative priority of messages. For example, messages from a person's boss would typically be given a higher priority than a social acquaintance. In some embodiments, a recipient has the ability to set their own priorities. In other embodiments, such as tactical communications, the recipient may have no or limited ability to set priorities. For example, a fire fighter may have no ability to lower the priority of messages from the fire chief. In either case, the MCMS module 30 uses the defined priority set to order in which available messages are rendered. For more details on defining priority and the order in which messages are rendered, see the above-incorporated application Ser. No. 12/028,400.

A sending-user has the ability to send urgent or highly important messages. By tagging a message as urgent or an emergency, the MCMS module 30 coordinates the rendering of the message as soon as possible on the legacy communication device of the recipient(s), overriding any priority settings. Any conflicts among multiple emergency messages are resolved based on a predetermined priority scheme.

E. MCMS, MCMS-C and MCMS-S Examples

In FIGS. 7 through 10, a series of diagrams illustrating the attributes of a conversation and the operation of MCMS, MCMS-C and MSMS-S is illustrated.

Figure 7:
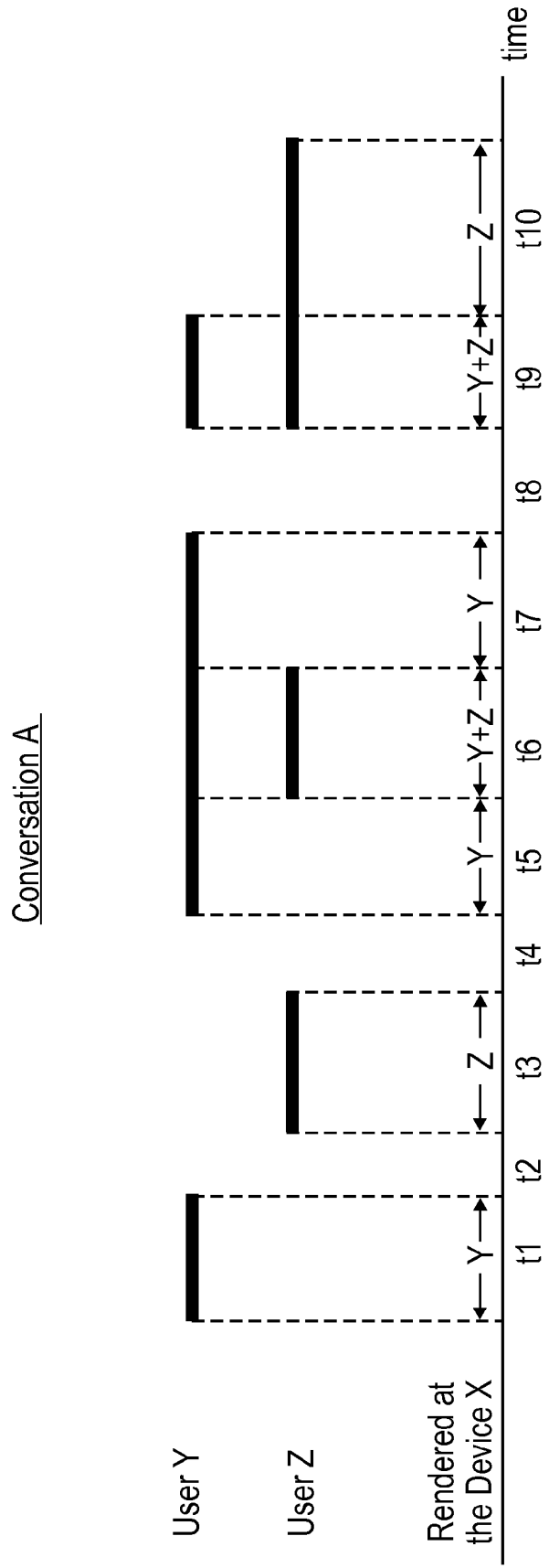
FIG. 7 illustrates the attributes of a conversation according to the present invention.

In FIG. 7, a time diagram illustrating the sequence of rendering the messages of a conversation labeled "A" between a user "X" using a legacy communication device 28 and two other participants, designated "Y" and "Z". In this example, media is generated by participant Y during the time intervals designated by t1, t5, 56, t7 and t9. Participant Z generates media during the time intervals designated t3, t6 and t9 through t10.

The rendering sequence at the legacy device 28 under the control of the Gateway client 12 is illustrated at the bottom of the figure. During intervals t1, t5, and t7, media derived only from Y is rendered. During intervals t3 and t10, only media derived from Z is rendered. In intervals t6 and t9, media from both Y and Z is rendered. In intervals t2, t4 and t8, nothing is being rendered because neither users Y or Z are generating media during these periods. It should be noted that intervals t1 through t10 are not intended to mean fixed time intervals, but rather, just periods of time when media is being generated.

The FIG. 7 diagram is useful in illustrating the attributes of conversations. When one participant is generating media (either Y or Z), that media is routed through the PIMB module 32 of the Gateway client 12 and is available for rendering at the legacy device 28. When both participants X and Y are generating media, both media streams are routed through the PIMB module 32 of the Gateway client 12 and are available for rendering at the legacy device 28. When neither user X or Y is generating media, no Media is routed through the PIMB module 32 of the Gateway client 12. As noted above, User X has the option of reviewing the media of the conversation in either the near real-time or time-shifted modes.

Figure 8:
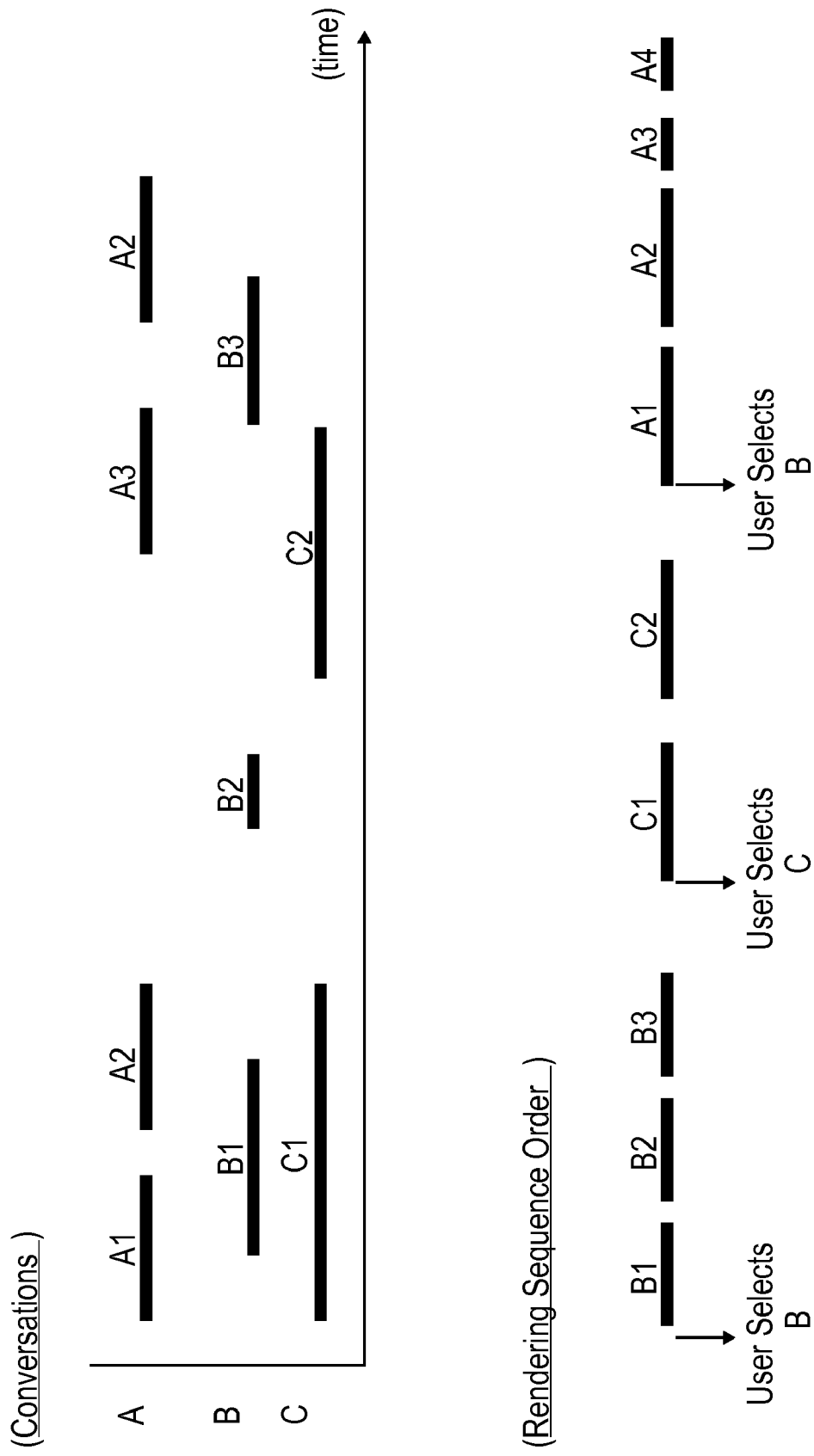
FIG. 8 illustrates the operation of a Multiple Conversation Management System (MCMS) mode according to the present invention.

FIG. 8 illustrates the operation of MCMS. In this example, a user of a legacy device 28 is participating in three conversations, designated A, B and C. For conversations A, B, and C, the user either generates or receives messages designated (A1, A2, A3, and A4), (B1, B2 and B3) and (C1 and C2) respectively. The start-time and duration of each message is indicated along the time-line. It is useful to note that in this example, all of the messages overlap in time to some degree, except Message B2.

With the MCMS conversation mode, the user selects one conversation as current. For the selected conversation, the user may review incoming messages and generate messages, which are transmitted to the other participants of the conversation. In this example, the user selects in order conversation B, C and A as current respectively. The message sequence is therefore initially B1, B2, and B3, followed by C1 and C2, and then finally A1 through A4. Again, while a particular conversation is selected as current, the user may transition between the near real-time and the time-shifted modes and back again. The final rendering as illustrated in the diagram is not intended to correspond in timing of the received messages as illustrated in the top portion of the diagram. Rather the lower portion of the diagram is intended to show only the rendering order of the messages, based on the conversation order selected by the user.

The example of FIG. 8 is thus useful in illustrating the attributes of the MCMS application. A User selects one conversation as current. The other conversations are paused. The user may also transition the current conversation among all the conversations at any time.

Figure 9:
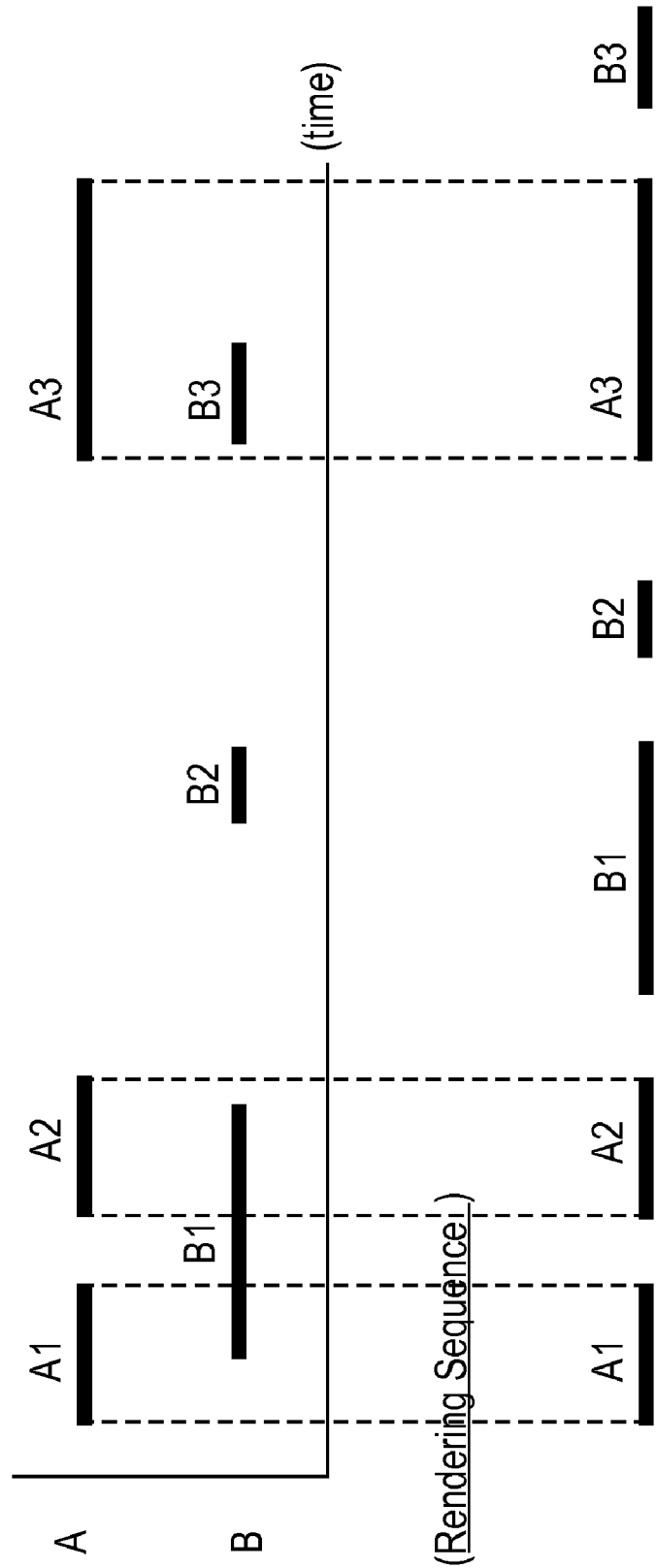
FIG. 9 illustrates the operation of Multiple Conversation Management System-Consecutive (MCMS-C) mode according to the present invention.

Referring to FIG. 9, a diagram illustrating the operation of the MCMS module 30 in the MCMS-C conversational mode is illustrated. In this example, the user of a legacy communication device 28 is participating in two consecutive conversations, A and B. With conversation A, three messages are received A1, A2, and A3. With conversation B, three messages are received B1, B2 and B3. It is useful to note that with this example, message B1 conflicts with messages A1. Also conversation A has a higher priority that Conversation B.

During the consecutive rendering of the two conversations, the higher priority messages A1 and A2 are first rendered in near real-time, as represented by the vertical dashed lines in the figure. Since there is a relatively large time gap between messages A2 and A3, this space is filled by time shifting and rendering messages B1 and B2. When A3 arrives, it is rendered in near real-time, while message B3 is rendered only after the higher priority message A3 is rendered. By time-shifting the rendering of the lower priority messages between the higher priority messages, consecutive multiple conversations can be managed. It should be noted that in this simple example, priority is the only parameter used to determine the consecutive order for rendering. As discussed in detail in the above-mentioned co-pending application, many other factors may be used is determining the rendering order of messages in the MCMS-C mode.

Referring to FIG. 10, a diagram illustrating the operation of the MCMS module 30 in the MCMS-S conversation mode is illustrated. In this example, a user is engaged in three simultaneous conversations, A, B and C. The timing and duration of the messages A1, A2 and A3, B1, B2 and B3, and C1 and C2 for each conversation is shown in the diagram respectively. With MCMS-S, the incoming messages are rendered at a legacy device 28 of the recipient as they are received. The rendering sequence of the messages of the three conversations A, B and C, as illustrated in the lower portion of the diagram, are therefore the same as when the messages were received. In this manner, multiple conversations may be simultaneously rendered.

In the aforementioned examples, several variations of the MCMS application were described, including MSMS-C and MCMS-S. Regardless of the specific type of MCMS application used, they all share several common characteristics. In each case, the conversations are defined by a threaded sequence or organization of messages. The messages are segmented from a stream of media, with each message given a sequence identifier and indexed by the time the media was created. Depending on the variation of the MCMS application, messages can be rendered in accordance with one or more rendering options. The rendering options include, in one form or another, the filtering, grouping overlapping and/or serialization of messages, using anywhere from zero to a plurality of different attributes. In this manner, multiple conversations, each including a string of messages, can be conducted on a single legacy device 28 using the Gateway client 12. Lastly, each of the variations of MCMS may handle the receipt of interrupt messages in the same way. When an interrupt message is received, it typically takes precedent over and is rendered before other messages belonging to other conversations.

Figure 11:
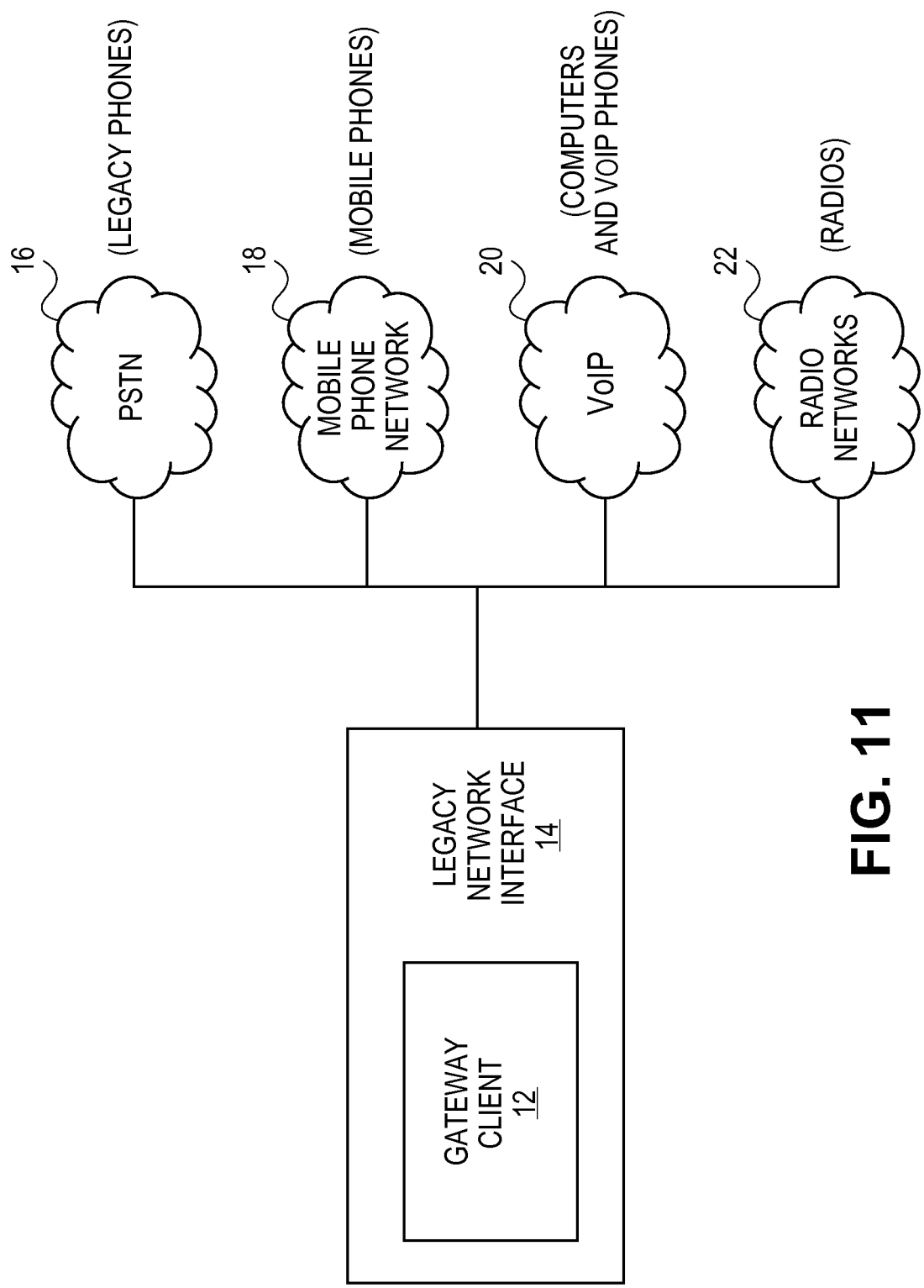
FIG. 11 is a diagram of a legacy network interface with a Gateway client embedded therein according to another embodiment of the present invention.

Referring to FIG. 11, a diagram of a legacy network interface with a Gateway client embedded therein according to another embodiment of the present invention. In this embodiment, the Gateway client 12, including the MCMS module 30 and the PIMB module 32, is embedded in the legacy network interface device 14.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A communication system, comprising:
 a gateway node, coupled to a communication network through an interface, the gateway node configured to progressively receive and progressively store streaming media associated with a conversation forwarded by a first participant of the conversation using a first communication device and intended for a second participant of the conversation using a telephone or radio, the storage of the streaming media at the gateway node occurring automatically without receiving store instructions from the second participant to store the streaming media;
 a user interface configured to receive conversation control instructions from the second participant of the conversation using the telephone or radio, the conversation control instructions directing the gateway node to selectively and progressively forward the streaming media over the communication network to the telephone or radio (i) as the streaming media is progressively received at the gateway node and (ii) out of storage at a selected time after the streaming media was received and progressively stored; and
 a converter configured to translate, as needed, the streaming media between the media formats used by the gateway node and the communication network.

2. The system of claim 1, wherein the interface is a PBX switch.

3. The system of claim 1, wherein the interface is a radio network interface.

4. The system of claim 1, wherein the conversation control instructions comprise:
 (a) voice activated signals;
 (b) DTMF signals; or
 (c) a combination of (a) and (b).

5. The system of claim 1, wherein the communication network is a PSTN.

6. The system of claim 1, wherein the telephone is a programmable wireless telephone and the network is a mobile phone network.

7. The system of claim 1, wherein the user interface comprises an application provided to the second participant of the conversation for installation on the telephone or radio.

8. The system of claim 1, wherein the user interface comprises a web page served by a web server and accessible by the second participant through a web browser.

9. The system of claim 1, further comprising first and second communication paths for communicating the streaming media and the conversation control instructions between the gateway node and the telephone or radio respectively.

10. The system of claim 1, wherein the streaming media and the conversation control instructions are transmitted over a single path between the gateway node and the telephone or radio.

11. The system of claim 1, wherein the user interface is further configured to receive the conversation control instructions from the second participant of the conversation through a computing device separate than the telephone or radio.

12. The system of claim 1, wherein the communication network comprises one of the following:
 (a) a PSTN;
 (b) a wireless telephone network;
 (c) a cellular network;
 (d) satellite network;
 (e) a radio network; or
 (f) any combination of (a) through (e).

13. The system of claim 1, wherein the interface comprises a mobile phone interface.

14. A communication method, comprising:
 progressively receiving at a gateway node, through an interface coupling the gateway node and a communication network, streaming media forwarded by a first participant of a conversation using a first communication device and intended for a second participant of the conversation using a telephone or radio;
 progressively storing on the gateway node the streaming media as the streaming media is received over the communication network through the interface the storage of the streaming media at the gateway node occurring automatically without receiving instructions from the second participant to store the streaming media;
 receiving conversation control instructions at the gateway node from the second participant using the telephone or radio;
 selectively and progressively forwarding, in response to the received conversation control instructions, the streaming media to the telephone or radio:
 (i) as the streaming media is progressively received at the gateway node; and
 (ii) out of storage at a selected time after the streaming media was received and progressively stored; and
 translating, as needed, the streaming media between media formats used by the gateway node and the communication network.

15. The method of claim 14, wherein progressively receiving the streaming media further comprises receiving the streaming media at the gateway node through a PBX switch.

16. The method of claim 14, wherein progressively receiving the streaming media further comprises receiving the streaming media at the gateway node through a radio network interface.

17. The method of claim 14, wherein the conversation control instructions comprise:
 (a) voice activated signals;
 (b) DTMF signals; or
 (c) a combination of (a) and (b).

18. The method of claim 1, wherein the communication network is a PSTN.

19. The method of claim 14, wherein the telephone is a wireless telephone and the network is a mobile phone network.

20. The method of claim 14, further comprising providing a user interface cooperative with the gateway node and configured to receive the conversation control instructions.

21. The method of claim 20, wherein providing the user interface further comprises providing an application to the second participant for installation on the telephone or radio and which is configured to communicate with the gateway node.

22. The method of claim 20, wherein providing the user interface comprises maintaining a web server for serving a web page configured to enable the second participant to communicate with the gateway node.

23. The method of claim 14, further comprising receiving the streaming media and the conversation control instructions at the gateway node over a first path and a second path respectively.

24. The method of claim 14, further comprising receiving the streaming media and the conversation control instructions at the gateway node over one path.

25. The method of claim 20, wherein the user interface is further configured to receive the conversation control instructions from the second participant from a computing device separate than the telephone or radio.

26. The method of claim 14, wherein the communication network comprises one of the following:
 (a) a PSTN;
 (b) a wireless telephone network;
 (c) a cellular network;
 (d) satellite network;
 (e) a radio network; or
 (f) any combination of (a) through (e).

27. The method of claim 14, wherein progressively receiving the streaming media comprises receiving the streaming media at the gateway node through a mobile telephone network interface.

28. The method of claim 14, wherein translating the streaming media further comprises translating the streaming media between the signal and packet domains.

29. The method of claim 14, wherein translating the streaming media further comprises translating the streaming media between a first media format used by the gateway node and a second media format used on the network.

* * * * *

UNITED STATES PATENT AND TRADEMARK OFFICE
CERTIFICATE OF CORRECTION

PATENT NO. : 8,233,598 B2  
APPLICATION NO. : 12/206548  
DATED : July 31, 2012  
INVENTOR(S) : Katis et al.

Page 1 of 1

It is certified that error appears in the above-identified patent and that said Letters Patent is hereby corrected as shown below:

Column 21, line 1: Change "The method of claim 1" to --The method of claim 14--

Signed and Sealed this
Fourth Day of December, 2012

David J. Kappos
*Director of the United States Patent and Trademark Office*